US007206750B2

(12) United States Patent
Tsukishima et al.

(10) Patent No.: US 7,206,750 B2
(45) Date of Patent: Apr. 17, 2007

(54) METHOD OF ASSISTING IN FORMING PLANS OF MEASURES OF MANAGEMENT REFORMS AND SYSTEM THEREOF

(75) Inventors: Takahiro Tsukishima, Zushi (JP); Tateo Shimizu, Owari-asahi (JP)

(73) Assignee: Hitachi, Ltd., Tokyo (JP)

( * ) Notice: Subject to any disclaimer, the term of this patent is extended or adjusted under 35 U.S.C. 154(b) by 785 days.

(21) Appl. No.: 09/964,335

(22) Filed: Sep. 28, 2001

(65) Prior Publication Data

US 2003/0055696 A1 Mar. 20, 2003

(30) Foreign Application Priority Data

Sep. 13, 2001 (JP) ............................ 2001-277440

(51) Int. Cl.
*G06F 19/00* (2006.01)

(52) U.S. Cl. ........................................................ 705/7

(58) Field of Classification Search .................... 705/7, 705/10

See application file for complete search history.

(56) References Cited

U.S. PATENT DOCUMENTS 5,216,593 A * 6/1993 Dietrich et al. ................ 705/8
5,689,631 A * 11/1997 Chenoweth .................. 714/11
5,715,185 A * 2/1998 Carter ........................... 705/7
5,905,666 A * 5/1999 Hoffman et al. ............... 705/8
5,946,212 A * 8/1999 Bermon et al. ............... 700/97
6,308,162 B1 * 10/2001 Ouimet et al. ................. 705/7
6,408,300 B1 * 6/2002 Bergman et al. ............ 707/101
2002/0198750 A1 * 12/2002 Innes et al. .................... 705/7

FOREIGN PATENT DOCUMENTS

JP 58014269 A * 1/1983
JP 59229604 A * 12/1984

* cited by examiner

*Primary Examiner*—Romain Jeanty
*Assistant Examiner*—Peter H Choi
(74) *Attorney, Agent, or Firm*—Mattingly, Stanger, Malur & Brundidge, P.C.

(57) ABSTRACT

The present invention provides a technique of assisting in forming plans of measures for management reforms, which are specific to an individual enterprise, and a technique of verifying formed plans of measures. In the present invention, a general business-operation-index vector f that includes a plurality of indexes indicating the condition of business management; a general plan-of-measures vector x including a plurality of plans of measures which are information about how to deal with the condition indicated by each index included in the general business-operation-index vector f; and a problem-index vector f', are used. On the basis of these, a problem-index-plan-of-measures matrix Mm' is produced which defines correlation between the problem-index vector f' and a plan-of-measures vector x' (Step 3221). A potential plan-of-measures vector x' is selected from the general plan-of-measures vector X by extracting the plans of measures in the column of the matrix Mm' (Step 3222). A gross-investment (necessary to execute plans of measures) matrix Mi is produced (Step 3223). A relational expression between the problem indexes and the plane-of-measures (f'=Mm'·x') are produced Step 3224).

17 Claims, 26 Drawing Sheets

| | MAJOR DIVISION OF CATEGORY OF BUSINESS | MINOR DIVISION |
|---|---|---|
| 1 | MANUFACTURING INDUSTRIES | HIGH-TECHNOLOGY PRODUCT ASSEMBLING |

| | LOSING-ORDER FACTOR | RELATIONAL EXPRESSION OF LOSING-ORDER FACTOR |
|---|---|---|
| 1 | DELAY OF PRESENTING ESTIMATE | $\Delta V=\beta \cdot \Delta LTq$ |

| | EXTRAORDINARY-LOSS FACTOR | RELATIONAL EXPRESSION OF EXTRAORDINARY-LOSS-FACTOR |
|---|---|---|
| 1 | TOO LONG SCHEDULING TOTAL LEAD TIME LT | $\Delta L=\alpha \cdot \Delta LTt$ |

| MAJOR ITEM | MINOR ITEM | RATIO RELATIVE TO SALES (%) |
|---|---|---|
| OVERHEAD COST | | 20 |
| | ORDER/SHIPMENT OPERATION | 6 |
| | SCHEDULING OPERATION | 8 |
| | PROCUREMENT OPERATION | 6 |
| DISPATCH COST | | 3 |
| | PRODUCT SHIPPING COST | 3 |
| DIRECT LABOR COST | | 12 |
| | TASK ASSIGNMENT OPERATION | 2 |
| | MANUFACTURING OPERATION | 10 |
| DIRECT MATERIAL COST | | 60 |
| | MATERIAL A | 20 |
| | MATERIAL B | 40 |
| TOTAL COST | | 95 |
| OPERATING PROFIT | | 5 |
| EXTRAORDINARY LOSS | | 2 |
| | DISPOSE OF UNDERPERFORMING ASSETS | 2 |
| PROFIT OF CURRENT PERIOD | | 3 |

| MAJOR ITEM | MINOR ITEM | INDEX VALUE |
|---|---|---|
| INDIRECT LABOR EFFICIENCY (SHIPPING QUANTITY/MAN) | | |
| | ORDER/SHIPMENT OPERATION | 100 |
| | SCHEDULING OPERATION | 20 |
| | PROCUREMENT OPERATION | 40 |
| DIRECT LABOR EFFICIENCY (SHIPPING QUANTITY/MAN) | | |
| | TASK ASSIGNMENT OPERATION | 100 |
| | MANUFACTURING OPERATION | 10 |
| INDIRECT LABOR LEAD TIME (NUMBER OF DAY/TIME) | | |
| | ORDER/SHIPMENT OPERATION | 5 |
| | SCHEDULING OPERATION | 20 |
| | PROCUREMENT OPERATION | 10 |

| | RELATIVE SELLING PRICE (BASED ON CURRENT PERIOD BEING TAKEN AS UNITY) |
|---|---|
| SECOND PREVIOUS PERIOD | 1.25 |
| PREVIOUS PERIOD | 1.05 |
| CURRENT PERIOD | 1 |

| MAJOR ITEM | MINOR ITEM | RATIO RELATIVE TO SALES (%) |
|---|---|---|
| OVERHEAD COST | | 5 |
| | ORDER/SHIPMENT OPERATION | 1 |
| | SCHEDULING OPERATION | 2 |
| | PROCUREMENT OPERATION | 1 |
| DISPATCH COST | | 3 |
| | PRODUCT SHIPPING COST | 3 |
| DIRECT LABOR COST | | 7 |
| | TASK ASSIGNMENT OPERATION | ? |
| | MANUFACTURING OPERATION | ? |
| DIRECT MATERIAL COST | | 60 |
| | MATERIAL A | 20 |
| | MATERIAL B | 40 |
| TOTAL COST | | 85 |
| OPERATING PROFIT | | 15 |

| MAJOR ITEM | MINOR ITEM | INDEX VALUE |
|---|---|---|
| INDIRECT LABOR EFFICIENCY (SHIPPING QUANTITY/MAN) | | |
| | ORDER/SHIPMENT OPERATION | 500 |
| | SCHEDULING OPERATION | 100 |
| | PROCUREMENT OPERATION | 130 |
| DIRECT LABOR EFFICIENCY (SHIPPING QUANTITY/MAN) | | |
| | TASK ASSIGNMENT OPERATION | 500 |
| | MANUFACTURING OPERATION | 10 |
| INDIRECT LABOR LEAD TIME (NUMBER OF DAY/TIME) | | |
| | ORDER/SHIPMENT OPERATION | 1 |
| | SCHEDULING OPERATION | 5 |
| | PROCUREMENT OPERATION | 5 |

| | PLAN OF MEASURES | INVESTMENT COST (M¥) | RISK LEVEL |
|---|---|---|---|
| 1 | INTRODUCTION OF ORDER MANAGEMENT SUBSYSTEM 1 | 5 | 1 |
| 2 | INTRODUCTION OF ORDER MANAGEMENT SUBSYSTEM 2 | 7 | 1 |
| 3 | INTRODUCTION OF ORDER MANAGEMENT SUBSYSTEM 3 | 3 | 2 |
| 4 | INTRODUCTION OF PRODUCTION MANAGEMENT SUBSYSTEM 1 | 10 | 1 |
| 5 | INTRODUCTION OF PRODUCTION MANAGEMENT SUBSYSTEM 2 | 10 | 1 |
| 6 | INTRODUCTION OF PRODUCTION MANAGEMENT SUBSYSTEM 3 | 10 | 2 |
| 7 | INTRODUCTION OF PROCUREMENT MANAGEMENT SUBSYSTEM 1 | 3 | 1 |
| 8 | INTRODUCTION OF PROCUREMENT MANAGEMENT SUBSYSTEM 2 | 10 | 2 |
| 9 | INTRODUCTION OF PLANT 1 FOR PRODUCTION | 10 | 1 |
| 10 | INTRODUCTION OF PLANT 2 FOR PRODUCTION | 500 | 3 |

| | | 1 | 2 | 3 | 4 | 5 | 6 | 7 | 8 | 9 |
|---|---|---|---|---|---|---|---|---|---|---|
| | PLAN OF MEASURES | INTRODUCTION OF ORDER MANAGEMENT SUBSYSTEM 1 | INTRODUCTION OF ORDER MANAGEMENT SUBSYSTEM 2 | INTRODUCTION OF ORDER MANAGEMENT SUBSYSTEM 3 | INTRODUCTION OF PRODUCTION MANAGEMENT SUBSYSTEM 1 | INTRODUCTION OF PRODUCTION MANAGEMENT SUBSYSTEM 2 | INTRODUCTION OF PRODUCTION MANAGEMENT SUBSYSTEM 3 | INTRODUCTION OF PROCUREMENT MANAGEMENT SUBSYSTEM 1 | INTRODUCTION OF PROCUREMENT MANAGEMENT SUBSYSTEM 2 | INTRODUCTION OF PLANT 1 FOR PRODUCTION |
| | INVESTMENT COST (M¥) | 5 | 7 | 3 | 10 | 10 | 10 | 3 | 10 | 10 |
| | RISK LEVEL | 1 | 1 | 2 | 1 | 1 | 2 | 1 | 1 | 1 |
| | PROCESSING VARIABLE | x 1 {0,1} | x 2 {0,1} | x 3 {0,1} | x 4 {0,1} | x 5 {0,1} | x 6 {0,1} | x 7 {0,1} | x 8 {0,1} | x 9 {0,1} |
| 1 | ΔFo | m11 | m12 | m13 | | | | | | |
| 2 | ΔFp | | | | m24 | m25 | m26 | | | |
| 3 | ΔFs | | | | | | | m37 | m38 | |
| 4 | ΔFd | | | | | | | | | m49 |
| 5 | ΔLTo | m51 | m52 | m53 | | | | | | |
| 6 | ΔLTp | | | | m64 | m65 | m66 | | | |
| 7 | ΔLTs | | | | | | | m77 | m78 | |

METHOD OF ASSISTING IN FORMING PLANS OF MEASURES OF MANAGEMENT REFORMS AND SYSTEM THEREOF

TECHNICAL FIELD

The present invention relates to a technique for assisting in planning a measures to reform business management of an enterprise, particularly, relates to a technique for assisting in planning a measures to reform business management of an enterprise, in which even an inexpert manager can obtain plans of measures for management reforms by using indexes that indicate the condition of business operations in the enterprise.

BACKGROUND ART

In for-profit companies such as an enterprise (joint-stock company), efficient business management is required in order to make a more profit by increasing sales and cutting cost. Accordingly, the manager has to grasp the problems on the management of his/her own enterprise, and considers from necessity what should be improved in order that the purpose of making a more profit can be attained. Further, the manager has to adopt plans of measures expected to obtain the utmost effect with limited funds at the time of consideration.

However, all of corporate managers cannot always form appropriate plans of measures to solve the problems on their business management. For example, there are a lot of inexpert corporate managers. There are enterprises employing a management system in which a plurality of departments constructing the enterprise are treated as independent enterprises and the management of department is delegated to the chief of each department. There are cases where such departments are established as other enterprises. In these cases, the chief of the department acts as a corporate manager in charge of the department. However, the chief of the department, who was one of the corporate members heretofore, generally has less experience in management. Hence, there are many cases where he/she asks for assistance in forming plans of measures for management reforms.

Such inexpert managers would intend to obtain knowledge helpful to the management reforms from various kinds of books as references. In fact, a lot of books about business management are issued. For example, such books include ones which scholarly describe business management, ones which introduce procedures of reforming business management based on a model particularly set, ones which mainly describe financial analysis and the like, and ones which introduce procedures of supply chain and the like.

For example, with respect to finance, methodology of finding measures by analysis of financial condition based on financial statements and the like are disclosed in the books about finance. Namely, with respect to finance, the financial condition of an enterprise can be generally indicated in the form of financial statements, regardless of the form of enterprise. Thus, there may be mentioned that financial management can be dealt with on the basis of the knowledge from the books about finance in many enterprises.

However, for an individual operation process such as manufacturing process in manufacturing industries, general methodology like financial analysis has not been established yet. Accordingly, it is difficult to find books directly helpful to forming plans of measures for management reforms, which is proper to an individual enterprise. Enterprises, which have the good fortune to agree with a model set in a certain book, can refer to the model. However, a number of enterprises hardly agree with models described in books. Thus, it is difficult to deal with reality of the management only with relying on the knowledge from the books.

Meanwhile, among corporate managers, there are persons who have much experience in business management. They were engaged upon the business management in various kinds of enterprises, and actually carried out management reforms to gain success. These successful persons did not always make good job in forming plans of measures from the beginning. They built up their experience in various kinds of failures so that they learned how to form plans of measures to deal with various situations, it leading them to current success. Namely, for forming plans of measures for management reforms, a lot of experience in judgment of which measures should be selected from various plans of measures, based on the current condition of the business operation, is required. However, it is obviously impossible to expect inexpert managers to have experience in forming plans of measures. Consequently, it is desirable that an excellent person who has the above-mentioned experience would be invited to an enterprise in need of management reforms and would participate in the management team. Also, it is desirable to assist an inexpert manager in management reforms by asking for advice from such experienced manager.

However, most of such excellent and experienced persons (managers) are usually engaged in the management of a particular enterprise and extremely busy. Therefore, there are few persons who can transfer to another enterprise or managers who can afford to give advice to another enterprise. Thus, it is in fact difficult to adopt the above-mentioned means in all of the enterprises in need of management reforms. In this respect, the same difficulty can be applied to a case where an excellent management consultant is invited. Furthermore, high cost is necessary for inviting an excellent person, therefore, it is difficult for a small-to-medium-size business in the cost.

By the way, there is a possibility that an experienced manager or consultant errs in his/her judgment. Therefore, it is preferred to verify the adequacy of the plans of measures for management reforms, which is planed out by himself/herself, before putting the plans of measures into practice. However, there has been no technology that can assist in such verification.

In the case of various kinds of corporations (juridical persons) such as charitable corporations that carry on the non-profit business, or organizations such as government and municipal organizations, it is required to efficiently proceed with their business operation within a limited budget. Accordingly, the management reforms in the business operation of these non-profit organizations involve the same problem as in a for-profit enterprise. Consequently, the term "enterprise" used herein refers to an entity carrying on business operation, which includes not only for-profit enterprises but also individually owned companies and non-profit enterprises.

An object of the present invention is to provide a technique for assisting in forming plans of measures for management reforms, which is specific to an individual enterprise, independent upon the amount of experience of the planner, and to also provide a technique for assisting in verifying the formed plans of measures.

SUMMARY OF THE INVENTION

In order to attain the above-mentioned purposes, according to the present invention, it is provided for a method of assisting in forming plans of measures for management reforms, which is executed by an information processor, wherein:

a general business-operation-index group including a plurality of indexes indicating the condition of business operation of an enterprise, a general plan-of-measures group including a plurality of plans of measures, each of which is information showing how to deal with the condition indicated by the respective indexes included in said general business-operation-index group, and the first correlation-information group including a plurality of correlation information, each of which defines the correlation between the respective indexes included in the general business-operation-index group and the respective plans of measures included in the general plan-of-measures group are stored in a data storage device;

a problem-index group is produced by extracting, as problem indexes indicating problems in the business operations to be improved, one or more business operation indexes from the general operation-index group and stored in the data storage device;

the second correlation-information group is produced by extracting correlation information relating to the problem indexes included in the problem-index group from the first correlation-information group;

a potential plan-of-measures group is produced by selecting one or more plans of measures relating to the second correlation-information group from the general plan-of-measures group; and the resultant one or more potential plans of measures included in the potential plans-of-measures group are output.

Further, according to another embodiment of the present invention, it is provided for a system of assisting in forming plans of measures for management reforms executed by an information processor, wherein:

said information processor includes an input device, a data storage device, a central processor, and an output device;

said data storage device stores a general business-operation-index group including a plurality of indexes indicating the condition of business operation of an enterprise, a general plan-of-measures group including a plurality of plans of measures, each of which is information showing how to deal with the condition indicated by the respective indexes included in said general business-operation-index group, a first correlation-information group including a plurality of correlation information, each of which defines the correlation between the respective indexes included in the general business-operation-index group and the respective plans of measures included in the general plan-of-measures group, and a problem-index group produced by extracting, as problem indexes indicating problems in the business operations to be improved, one or more business operation indexes from the general operation-index group; and said central processor executes the following steps of:

producing a second correlation-information group by extracting correlation information relating to the problem indexes included in the problem-index group from the first correlation-information group;

producing a potential plan-of-measures group by selecting one or more plans of measures relating to the second correlation-information group from the general plan-of-measures group; and outputting the resultant one or more potential plans of measures included in the potential plan-of-measures group through the input/output device.

Furthermore, according to still another embodiment of the present invention, it is provided for a program product read in and executed by a computer having a storage device to cause said computer to perform processing of assisting in forming plans of measures for management reforms, wherein:

the program causes the computer to perform the following processing of:

storing a general business-operation-index group including a plurality of indexes indicating the condition of business operation of an enterprise, a general plan-of-measures group including a plurality of plans of measures, each of which is information showing how to deal with the condition indicated by the respective indexes included in said general business-operation-index group, and the first correlation-information group including a plurality of correlation information, each of which defines the correlation between the respective indexes included in the general business-operation-index group and the respective plans of measures included in the general plan-of-measures group in a data storage device;

producing a problem-index group by extracting, as problem indexes indicating problems in the business operations to be improved, one or more business operation indexes from the general operation-index group and storing the group in the data storage device;

producing the second correlation-information group by extracting correlation information relating to the problem indexes included in the problem-index group from the first correlation-information group;

producing a potential plan-of-measures group by selecting one or more plans of measures relating to the second correlation-information group from the general plan-of-measures group; and outputting the resultant one or more potential plans of measures included in the potential plans-of-measures group.

BRIEF DESCRIPTION OF THE DRAWINGS

FIG. 8 is an explanatory diagram schematically showing a structure in which category-of-business data indicating the category of business are stored;

FIG. 9 is an explanatory diagram schematically showing a structure in which losing-order-factor data indicating factors of losing an opportunity to gain an order are stored;

FIG. 10 is an explanatory diagram schematically showing a structure in which extraordinary-loss-factor data indicating factors of causing extraordinary loss are stored;

FIG. 11 is an explanatory diagram schematically showing a structure in which cost-structure data are stored;

FIG. 12 is an explanatory diagram schematically showing a structure in which index data are stored;

FIG. 13 is an explanatory diagram schematically showing a structure in which selling-price-trend data are stored;

FIG. 14 is an explanatory diagram schematically showing a structure in which cost-item-benchmark data are stored;

FIG. 15 is an explanatory diagram schematically showing a structure in which index-benchmark data are stored;

FIG. 16 is an explanatory diagram schematically showing a structure in which plan-of-measures data are stored;

FIG. 29 is an explanatory diagram schematically showing the relationship between problem indexes and plans of measures together with elements of the matrix Mm'.

BEST MODE FOR CARRYING OUT THE INVENTION

Embodiments of the present invention will be described below with reference to the drawings. The present invention is applied to assistance in forming plans of measures for management reforms of an enterprise. For example, when the manager or person in charge of management reforms in an enterprise forms plans of measures for management reforms in his/her enterprise, the present invention is applied to assistance in forming the same. Further, the present invention is applied to a service of proposing plans of measures to an enterprise that intends to carry out management reforms, as business. Furthermore, the present invention can also be utilized to verify plans of measures formed by another method.

The present invention assists in forming plans of measures for management reforms with an information processor. Namely, a system for assisting in forming plans of measures is constructed by the use of an information processor. In an embodiment mentioned below, the present invention will be described with reference to an example in which the present invention is applied to manufacturing industries. However, the present invention is basically applicable to any categories of business.

Figure 1:
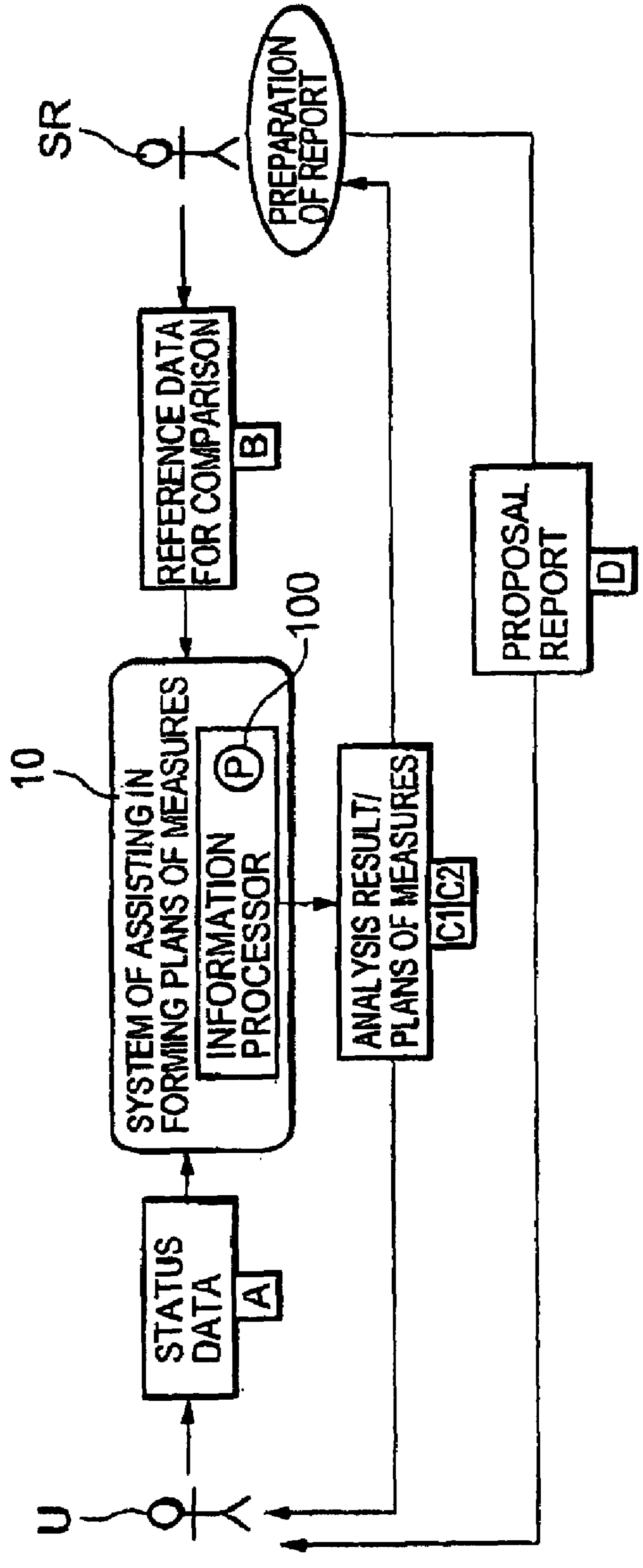
FIG. 1 is an explanatory diagram showing an outline of a method of assisting in forming plans of measures for management reforms of a enterprise according to the present invention.

FIG. 1 shows the outline of a service of assisting in forming plans of measures for management reforms, to which the present invention is applied. In FIG. 1, the service of assisting in forming plans of measures for management reforms is performed by causing an information processor 100 constituting therein a system for assisting in forming plans of measures for management reforms 10 (hereinafter referred simply as "system 10") to execute a program for assisting in forming plans of measures for management reforms P (hereinafter referred to simply as "program P")). Namely, the system 10 reads therein status data A which show current condition of business operation of an subject enterprise ST (hereinafter referred to simply as "subject enterprise ST" or "subject enterprise) and reference data for comparison B (hereinafter referred to simply as "reference data B) which are data appearing in the market with respect to enterprises other than the subject enterprise, and analyzes the condition of business operation in the subject enterprise and forms plans of measures through the program P, which is previously installed therein, to output results C1 (result of analysis) and C2 (plans of measures). The result of the analysis and the plans of measures can separately be output. The results C1 and C2 are provided to the subject enterprise ST and a service provider SR that renders a service of assisting in forming plans of measures for management reforms. The service provider SR can further draw up a proposal report D based on the results C1 and C2 with a computer and provide it to the subject enterprise ST via a network.

Here, subjects who are rendered the service of assisting in forming plans of measures for management reforms, include not only subject enterprises but also consultants and consulting companies, which offer counsel to the client enterprises of their management reforms. In fact, the service is rendered to the managers and persons in charge of promoting management reforms of subject enterprises, and consultants, they being hereafter referred to as users U.

Next, various embodiments of rendering the service of assisting in forming plans of measures for management reforms according to the present invention will be described with reference to FIGS. 2A to 2F. Respective examples shown in FIGS. 2A to 2F are basically built on the concept of the service of assisting in forming plans of measures for management reforms as shown in FIG. 1. Details of the status analysis of the subject enterprise and the forming of plans of measures will be described later.

Figure 2A:
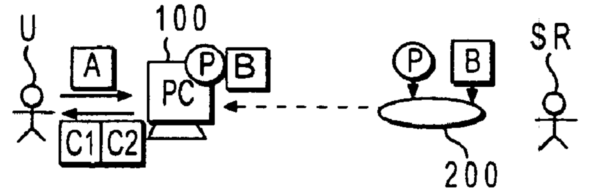
FIGS. 2A to 2F is an explanatory diagram showing an outline of a system of assisting in forming plans of measures, which is used for rendering a service of assisting in forming plans of measures for management reforms.

In the example shown in FIG. 2A, the system 10 is constructed by the use of an information processor 100. Namely, the information processor 100 reads therein status data A of a subject enterprise and reference data B, executes a program P previously installed thereon to perform an analysis and a proposal of plans of measures for management reforms, and outputs results C1 and C2. A service provider SR provides a recording medium 200 that stores therein the reference data B and the program P to a user U. At this time, the service provider SR can make a profit, for example, through selling and leasing the recording medium 200, and collecting tolls of the software (program) and the data. The service provider SR carries out accounting processing in order to secure earnings. The accounting processing may be carried out by a separate system.

The recording medium 200 may be, for example, a CD-ROM and the like. Each time when the program P and data are updated, a new recording medium 200 which stores therein the updated program and data is provided for the user U. The program and data in the information processor 100 may be updated by means of downloading updated ones via a network NW. At the time of update, the service provider SR can secure a profit by means of accounting the toll of new data.

Figure 3:
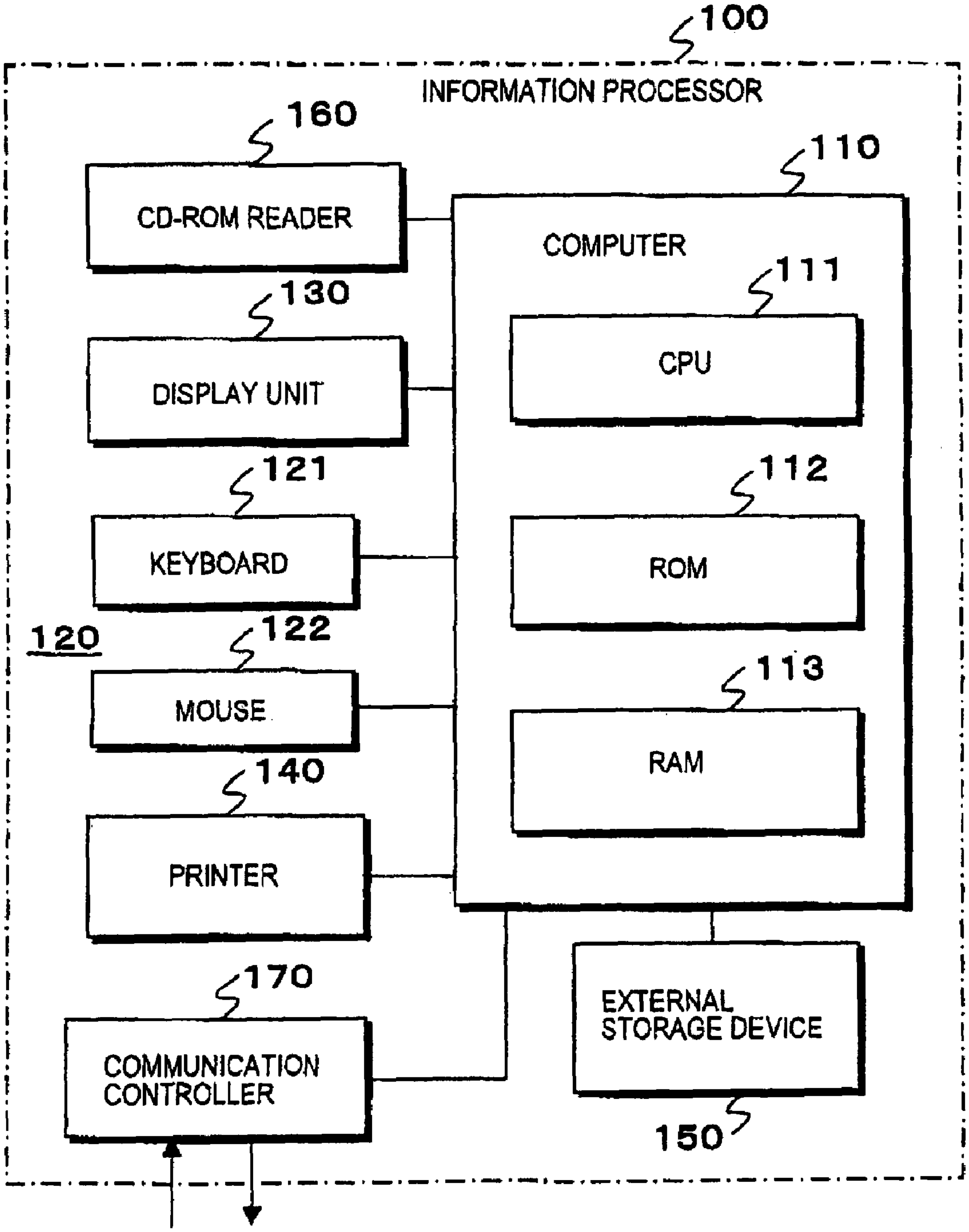
FIG. 3 is a block diagram showing an example of the hardware system constitution of an information processor which constructs the system of assisting in forming plans of measures.

The system 10 is composed of an information processor 100 as shown in FIG. 3. The information processor 100 shown in FIG. 3 comprises a computer 110 which includes a Central Processing Unit (CPU) 111, Read Only Memory (ROM) 112 and Random Access Memory (RAM) 113. The computer 110 executes various operation processing, an external storage device 150 which stores therein various kinds of programs executed by the computer 110 and necessary data, input devices 120 including a keyboard 121 and a mouse 122, a display unit 130 such as a liquid crystal display (LCD) or a cathode ray tube (CRT), a printer 140, a CD-ROM reader 160 which reads a program and data stored in a CD-ROM, and a communication control unit 170 which performs communication via a network.

Figure 4:
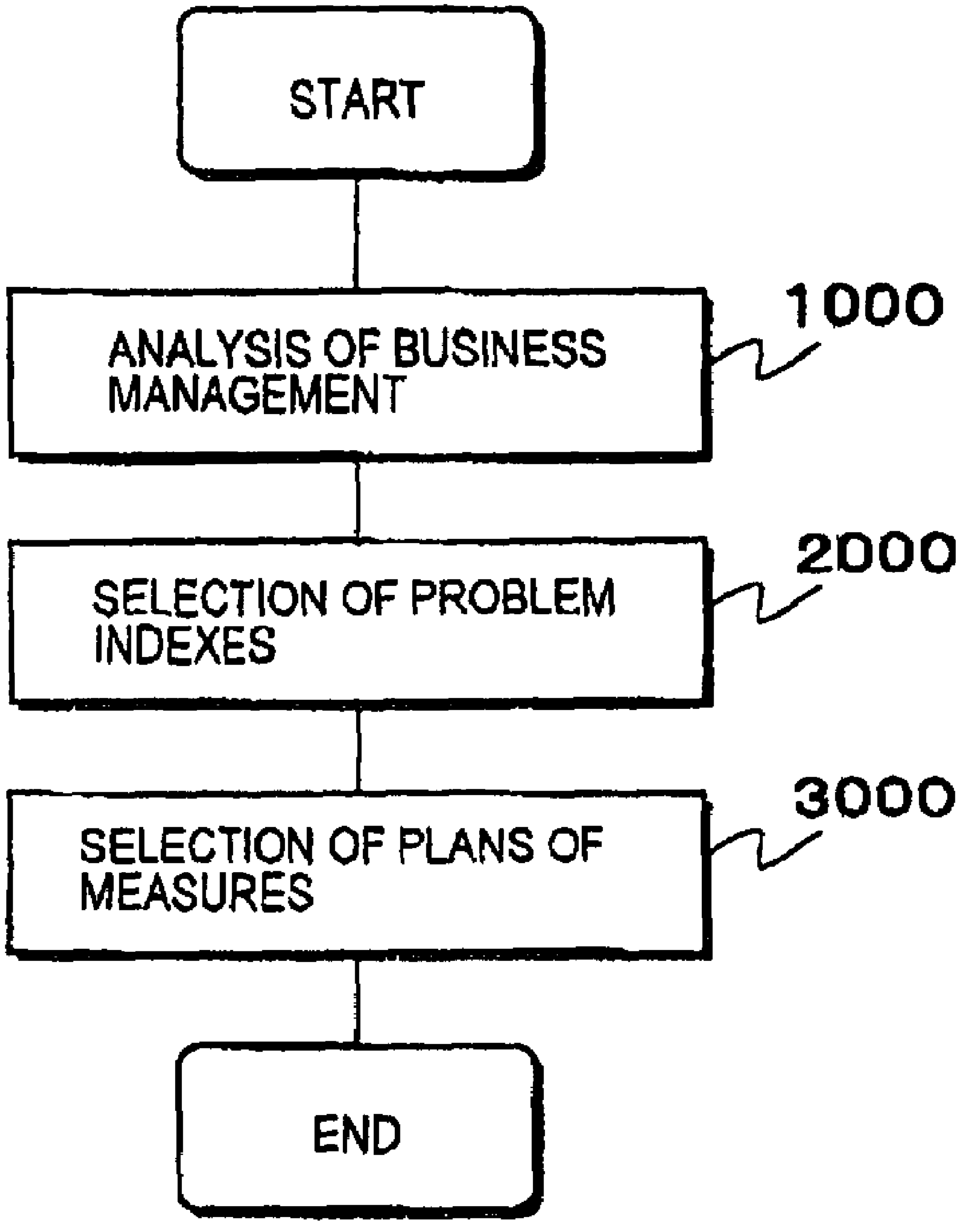
FIG. 4 is a flow chart showing the outline of setting problem indexes and processing of assisting in forming plans of measures by a program of assisting in forming plans of measures.

In the information processor 100, the program P stored in the recording medium 200 is read through the CD-ROM reader 160 and is installed in the external storage device 150. The computer 110 reads the reference data B from the recording medium 200 and accepts input of status data A indicating the status condition of business operations in the subject enterprise, via the input device 120. Further, the computer 110 performs analysis for the status condition of business operations in the subject enterprise by, for example, benchmarking through the program P by using the input status data A and the reference data B, as shown in FIG. 4. Then, the result of the analysis C1 is output to the display unit 130 or the printer 140 (Step 1000). Furthermore, the computer 110 performs processing of selecting problem indexes by utilizing the result of analysis C1 (Step 2000). Then, plans of measures which improve the problems indicated by the selected problem indexes, are selected from a plurality of plans of measures previously provided, and the result of the selection of plans of measures (i.e. result C2) is output. The selected plans of measures are output to the display unit 130 or the printer 140 (Step 3000). Alternatively, the results C1 and C2 may be transmitted to another computer not shown in FIG. 2A. If data necessary for selection of the problem indexes are already given, Step 1000 may be omitted. In addition, if the problem indexes are already specified, Step 2000 may also be omitted.

In this embodiment, as mentioned above, plural kinds of plans of measures are previously provided for. For the problem indexes, the plans of measures of interest are extracted from the plural kinds of plans of measures through the algorithm predetermined on the basis of the status data A. Here, the plural kinds of plans of measures previously provided for the selection have been set on the basis of the knowledge of experts such as experienced managers. On the other hand, the algorithm for selecting plans of measures of interest through an information processor has been devised by the present inventors.

Figure 2B:
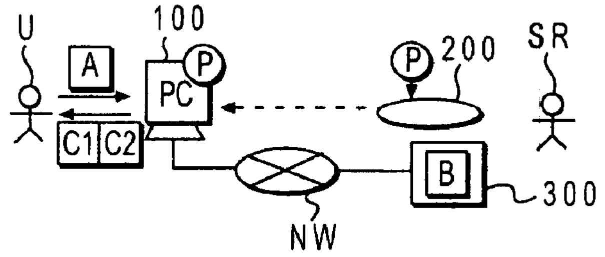

In an example shown in FIG. 2B, a system 10 is constructed, in which the information processor 100 reads therein the status data A of the subject enterprise and the reference data B, and performs analysis and formation of plans of measures through the program P, to output the results C1 and C2. In this embodiment, a sever 300 which stores therein the reference data B is provided for. The server 300 transmits the reference data B therefrom in accordance with the request from the information processor 100. The reference data B stored in the server 300 are always updated to keep them to date. Therefore, the information processor 100 can always use the current reference data B. The program P is provided through the recording medium 200. Processing in the information processor 100 are the same as in the embodiment explained in FIG. 2A except that the reference data B is downloaded from the server 300. Accordingly, redundant explanation is omitted. In the example of FIG. 2B, it is considered that accounting processing is done at the time of providing the recording medium 200 and at the time of downloading the reference data B. The other possibilities of accounting are the same as those in the above-mentioned example shown in FIG. 2A.

Figure 2C:
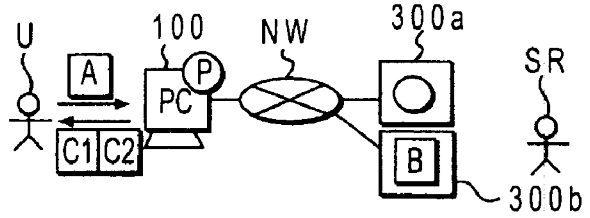

In an example shown in FIG. 2C, a service provider SR owns a server 300*a* for storing therein the program P, and a server 300*b* for storing therein the reference data B, and transmits the program P and the reference data B from the servers 300*a* and 300*b*, respectively, via a network in accordance with the request from a user U. In this example, the information processor 100 downloads the program P and the reference data B from the servers 300*a* and 300*b*, respectively, only when processing of forming plans of measures is performed. Therefore, the information processor 100 needs not store therein all the time the program P and the reference data B. Processing in the information processor 100 are the same as in the example shown in FIG. 2A.

In the example shown in FIG. 2C, a system for collecting toll can be constructed by means of accounting to the user U every time when downloading the program P and reference data B.

Alternatively, in the example shown in FIG. 2C, the servers 300*a* and 300*b* may be constituted in a single server (not shown).

In addition, in the case of FIG. 2C, a system may be constituted in which the information processor 100 sends the status data A of a subject enterprise to the server 300_a_, processing of forming plans of measures is performed in the server 300_a_, and the results C1 and C2 are fed back to the information processor 100. This system is suitable for a case where, for example, in an enterprise having a plurality of places of business, the server 300 is established in the head office and the information processors 100 are established in respective places of business so as to connect therebetween to each other via a network NW. In this case, when the server 300 receives status data A from the information processor 100 of respective places of business, it performs processing of forming plans of measures on the basis of the status data A and the reference data B to feed back the results C1 and C2 to the information processor 100 of the place of business which sent thereto the status data A.

Figure 2D:
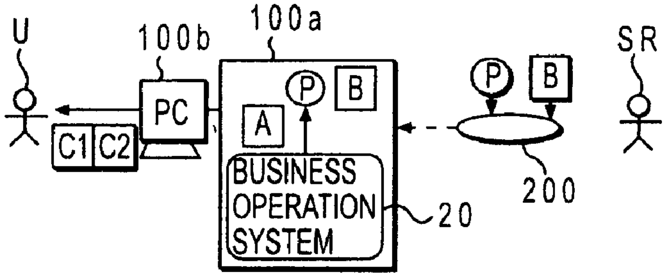

In an example shown in FIG. 2D, the system 10 as shown in FIG. 1 is constructed through an information processor 100_a_. Namely, the information processor 100_a_ reads therein the status data A of a subject enterprise from a business operation system 20 that runs on a separate application program. The business operation system 20 includes, for example, a finance management system and a manufacturing management system. On the other hand, the information processor 100_a_ reads therein the reference data B and the program P from the recording medium 200. Then, the information processor 100_a_ performs analysis and forming plans of measures on the basis of the status data A and the reference data B through the program P, to output the results C1 and C2. However, in this example, the information processor 100_a_ transmits the results C1 and C2 in accordance with the request from another information processor 100_b_. The information processor 100_b_ outputs the results C1 and C2 to the display unit 130 or the printer 140 in accordance with the request from a user U. Here, as the information processors 100_a_ and 100_b_, ones which have the same constitution of, for example, the information processor 100 as shown in FIG. 3 can be used.

While the example shown in FIG. 2D employs a constitution in which the status data A is read from the business operation system 20, the present invention is not limited to this constitution. For example, a portion of the status data A may be read from a business operation system 20 and the residual portion thereof from another business operation system 20. Alternatively, a constitution may be employed in which a portion of the status data A is input to the information processor 100_b_ via the input device 120 thereof.

Figure 2E:
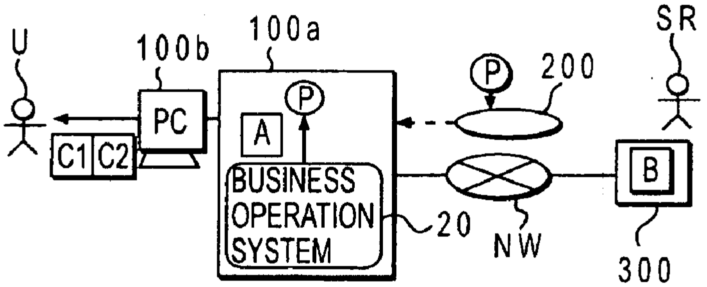

An example shown in FIG. 2E shows a system in which an information processor 100_a_ assists in analysis and formation of plans of measures in the same manner as in the example shown in FIG. 2D. However, the example shown in FIG. 2E is different from the one shown in FIG. 2D in that the reference data B is gotten via a network NW. The function and operation of the information processor 100_a_ are basically the same as those in the above-mentioned example shown in FIG. 2D, redundant explanation being omitted.

Figure 2F:
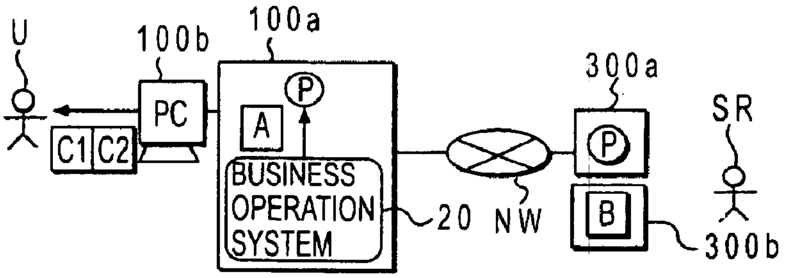

An example shown in FIG. 2F shows a system in which an information processor 100_a_ assists in analysis and formation of plans of measures in the same manner as in the example shown in FIG. 2D. However, the example shown in FIG. 2F is different from the one shown in FIG. 2D in that the program P and the reference data B are gotten from the servers 300_a_ and 300_b_, respectively, via a network NW. The servers 300_a_ and 300_b_ can be constituted in a single server (not shown). The function and operation of the information processor 100_a_ are basically the same as those in the above-mentioned example shown in FIG. 2D, redundant explanation being omitted.

Next, the assistance in forming plans of measures performed in the various examples described above will be explained. Here, explanation will be made on the basis of the above-mentioned example shown in FIG. 2A. Of course, the below-mentioned explanation is applicable to the above-mentioned examples of FIGS. 2B to 2F. Further, it is applicable to embodiments not specifically shown herein, too.

Figure 5:
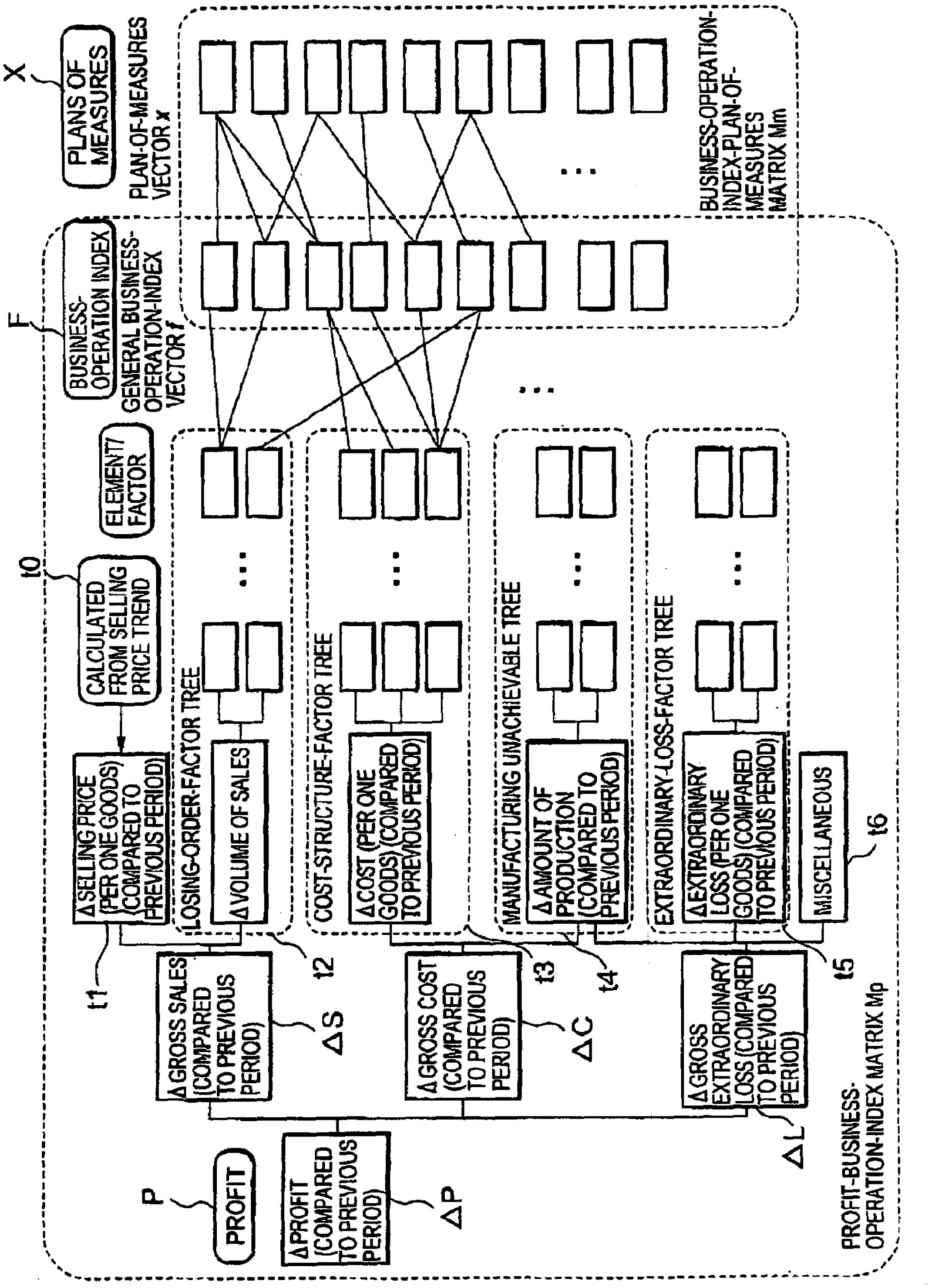
FIG. 5 is explanatory diagram showing that profit and plans of measures are related to each other with a tree-structure.

Prior to concrete explanations, the basic concept of the present invention will be first described with reference to FIG. 5. FIG. 5 is a tree-structured diagram which shows a relationship between problems relating to decrease in profits and plans of measures. The present inventors devised this relationship as follows. Namely, the present inventors interviewed persons (managers) sufficiently experienced in management reforms, with respect to procedure to form plans of measures for management reforms, arranged systematically the answers obtained from the interview and formulated them to be able to be treated by an information processor.

An enterprise can continuously run a business by properly assuring sales S obtained by selling goods for sale, and profit P obtained by subtracting cost C necessary to sell the goods for sale, such as cost of manufacturing and administrative costs for marketing, from the sales S. The term "goods for sale" used herein means not only manufactured goods (herein, it may be referred to as "(manufactured) product") but also any kinds of services. However, the explanation herein will be made of manufacturing industries, therefore, the goods for sales means manufactured goods.

A downturn in business means lapse into a state that proper profits cannot be secured. The downturn in business is caused when sufficient sales cannot be secured while costs increase. In the present invention, to a ratio of profit of the current period relative to that of the previous period, Δ profit (ΔP), a ratio of gross sales of the current period relative to that of the previous period, Δ gross sales (ΔS), a ratio of gross cost of the current period relative to that of the previous period, Δ gross cost (ΔC) and a ratio of extraordinary loss of the current period relative to that of the previous period, Δ extraordinary loss (ΔL) are linked as factors of fluctuating the Δ profit. Further, as the cause of fluctuating the Δ gross sales (ΔS), a ratio of selling price of manufactured goods in the current period relative to that in the previous period, Δ selling price t1, which is found from selling price trend t0 and a tree t2 showing causes by which sales could not secure, are linked to the Δ gross sales Δs the typical examples, FIG. 5 shows a losing-order-factor tree t2, which indicates the causes of losing an opportunity to gain an order. Also, as causes of fluctuating the Δ gross cost, a cost-structure tree t3 showing the cost structure and a manufacturing-unachievable-factor tree t4 showing the causes by which production could not achieve the target, are linked to the Δ gross cost Furthermore, as the causes of fluctuating the Δ extraordinary loss (ΔL), the manufacturing-unachievable-factor tree t4, a extraordinary-loss-factor tree t5 showing the causes of the extraordinary loss and a miscellaneous-factor tree t6 are linked to the Δ extraordinary loss Here, an business-operation-index group which is a set (assembly) of business-operation-indexes indicating elements in the business operation process to be reformed, is considered. This business-operation-index group is expressed as a vector to be an business-operation-index vector f. The business-operation-index vector f is linked to the Δ profit (ΔP) by the Δ profit-fluctuation-factor trees. Namely, by the use of a matrix Mp including correlation information of the profit-business-operation-index, which is comprised of elements of the respective factor trees, the relationship between ΔP and f can be expressed by the following equation:

$$\Delta P = Mp \cdot f \quad (1)$$

On the other hand, as problems in the business operation process to be solved, a problem-index group including the business-operation-indexes which shows the problems to be solved, is selected from the business-operation-index group, depending upon the factors of decreasing profit. The problem-index group is expressed as a vector to be a problem-index vector f. This selection can be carried out with reference to the result of benchmarking that is performed by means of comparison of the status data A with the reference data B. Here, the business-operation-indexes comprise indexes that can generally be considered in a category of business. Accordingly, with respect to such generally considered indexes may be referred to as the "general business-operation-index vector f or the "general business-operation-index group", if necessary.

Here, a profit which fluctuates in accordance with the problem-index referred to as ΔP. When a matrix composed of, its elements, items which construct the trees selected from the above-mentioned trees, as elements fluctuating the profit, is a matrix Mp', and a vector composed of indexes selected as the problem from the general business-operation-index vector f, is a problem-index vector f', the A profit (ΔP') is expressed by an equation described below. Namely, the A profit (ΔP') has a correlation with the problem-index vector f'.

$$\Delta P' = Mp' \cdot f' \quad (2)$$

On the other hand, the general business-operation-index vector f is correlated with general plan-of-measures vector x composed of a group of plans of measures that can be generally considered corresponding to the general business-operation-index vector f. Respective plans of measures included in the general plans-of-measures vector x are empirically set and previously provided. When a matrix correlating the business operation indexes with the plans of measures is a matrix Mm, between the general business-operation-index vector f and the general plan-of-measures vector x, there is a relationship expressed by the following equation:

$$f = Mm \cdot x \quad (3)$$

When plans of measures vector x to be executed is extracted from the general plan-of-measures vector x including all of the previously provided plans of measures, the problem-index vector f' has already been selected from the general business-business-operation-index f. Therefore, a matrix $M_m$ is obtained by extracting the elements relating to the problem-index vector f' from the business-operation-index-plan-of-measures matrix Mm. Accordingly, the selected plan-of-measures vector x' is given by the following equation:

$$f' = Mm' \cdot x' \quad (4)$$

Figure 23:
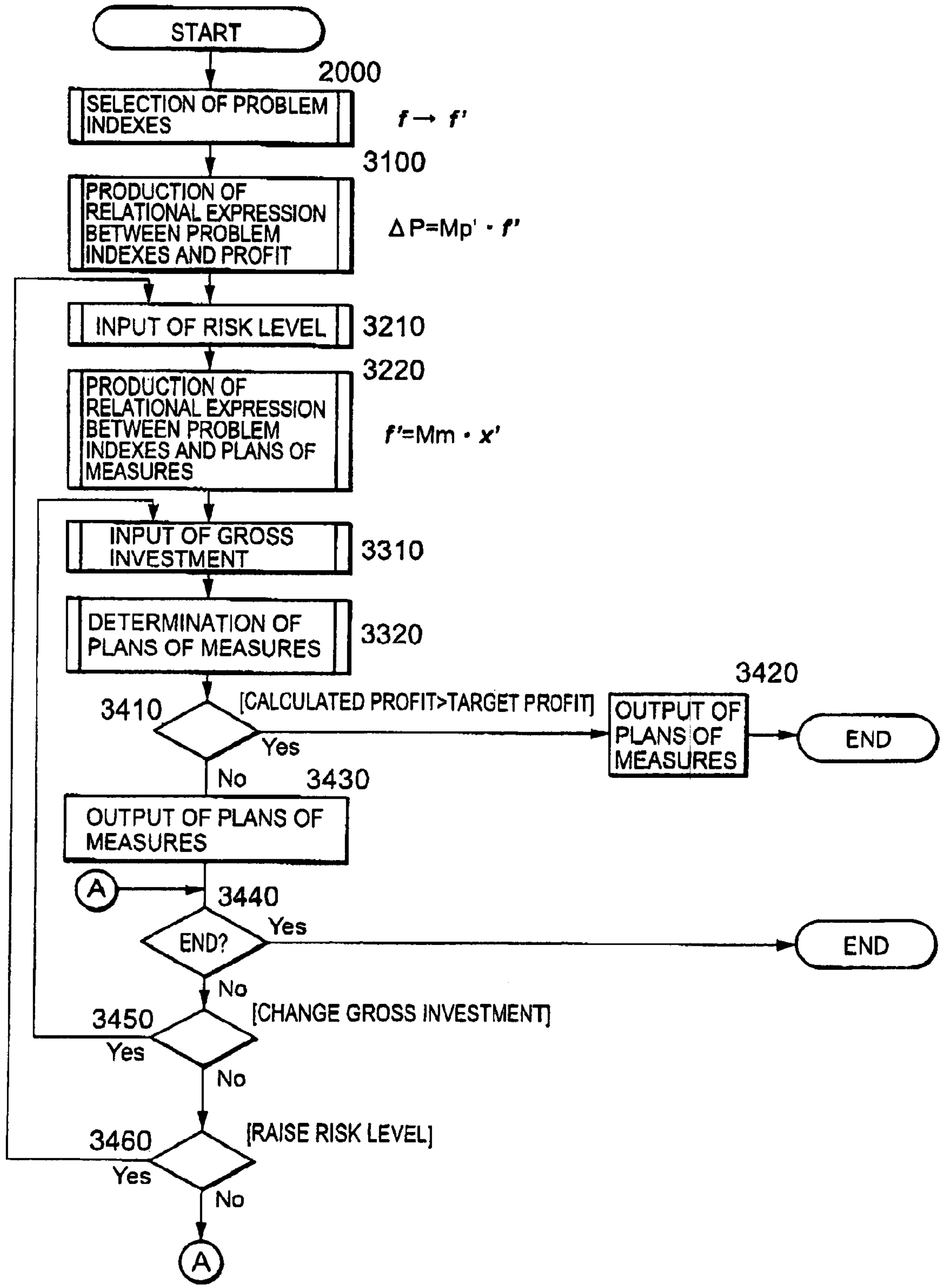
FIG. 23 is a flow chart indicating the procedure for selecting problem indexes and plans of measures.

In the present invention, the problem-index vector f' is selected by the use of the status data A and the reference data B, as shown in the above-mentioned Steps 2000 and 3000 in FIG. 4. Based on the selected problem-index vector f', processing of selecting plans of measures vector x' corresponding to the problem-index vector f' from the general plan-of-measures vector x previously provided, is performed. Further, verification processing is performed with respect to the relationship between the plans of measures vector x' and the amount of investment therefor. FIG. 23 shows a procedure of selecting the plans of measures. Prior to an explanation of the procedure, the business operation processes of the subject enterprise and examples of various data used for selection of the plans of measures will be described briefly.

Figure 7:
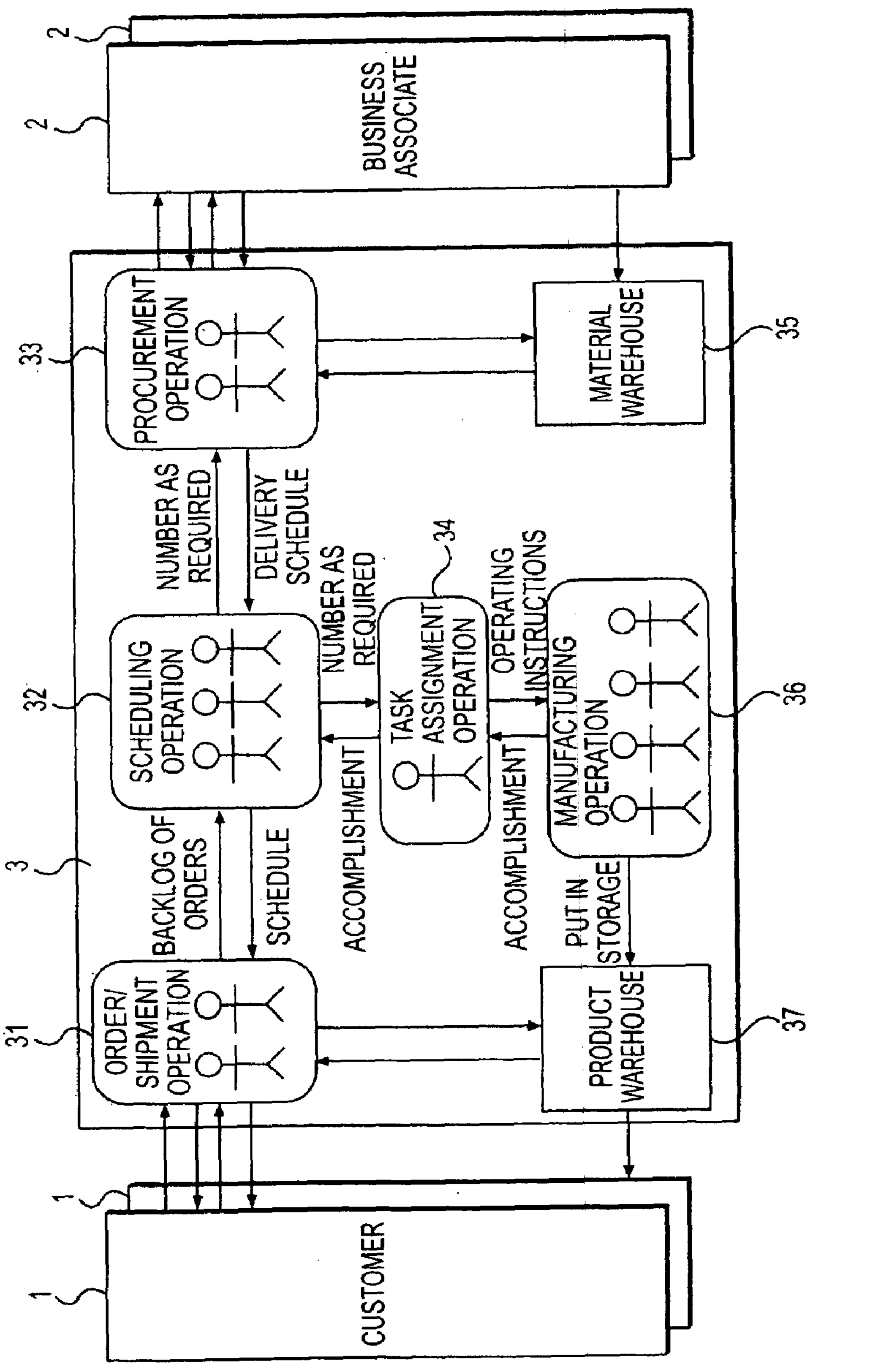
FIG. 7 is a block diagram showing an outline of business operation process to be reformed in an enterprise subjected to management reforms.

FIG. 7 shows an outline of the business operation process to be reformed in the subject enterprise. In FIG. 7, a production operation in a maker 3 is shown as an example. The maker 3 conducts a various operations between a plurality of customers 1 to which the maker 3 supplies manufactured goods of its own and a plurality of business associates 2 from which the maker 3 gets in parts and the like.

An order/shipment operation 31 conducts respective processing of accepting request for estimation from the customer 1, issuing an estimate thereto, receiving an order therefrom, and informing the acceptance of order thereto. Further, the order/shipment operation 31 conducts respective processing of checking inventory in a product warehouse 3 and instructing thereto take products out of storage. Furthermore, the order/shipment operation 31 conducts respective processing of instructing a scheduling operation 32 to prepare a production schedule of products manufactured on order and receiving information of the production schedule therefrom.

The scheduling operation 32 draws up a plan of manufacturing products as ordered on the basis of the delivery date, quality and quantity thereof. When parts, materials and the like are newly necessary, the scheduling operation 32 informs of the number of the parts, the amount of material or the like to be needed to a procurement operation 33. Further, the scheduling operation 32 informs of the number of products to be manufactured to a task assignment operation 34, in accordance with the plan of manufacturing.

The procurement operation 33 conducts respective processing of requesting of a business associate 2 to estimate the parts necessary to be supplied, receiving the estimate therefrom, making an order thereto and receiving the acceptance of order therefrom. Further, the procurement operation 33 informs to the scheduling operation 32 of the delivery schedule of the parts or material. Furthermore, the procurement operation 33 conducts respective processing of checking arrival of the material or the like to a material warehouse 35 and instructing thereto to take material out of storage.

The task assignment operation 34 is informed of the number of products to be manufactured from the scheduling operation 32. Subsequently, the task assignment operation 34 assigns the necessary work to a manufacturing operation 36, and instructing thereto to start the work. Further, the task assignment operation 34 informs the scheduling operation 32 of the accomplishment of production received from the manufacturing operation 36.

The material warehouse 35 stores the parts, material and the like delivered from the business associate 2. Further, the material warehouse 35 reports to the procurement operation 33 that the parts, material and the like were put in storage.

The manufacturing operation 36 conducts manufacturing control in accordance with the operating instructions assigned from the task assignment operation 34, and reports the accomplishment of manufacture thereto. Further, the manufacturing operation 36 receives the parts, material and the like from the material warehouse 35 and manages manufacturing products, and conducts processing of entering the manufactured products in the product warehouse 37.

The product warehouse 37 dispatches the manufactured products to the customer 1 in accordance with the instructions from the order/shipment operation 31. Subsequently, the product warehouse 37 informs the order/shipment operation 31 of entering thereto and dispatching therefrom of the products, respectively.

Next, the configuration of function in a system of assisting in forming plans of measures used in this embodiment will be explained with reference to FIG. 6. A system shown in FIG. 6 can be realized by, for example, the hardware system as shown in FIG. 3 mentioned above. The system shown in FIG. 6 comprises an input-data-checking module 1101 that checks input data, a problem-index-selecting module 1102 that performs processing of selecting a problem-index vector f from the general business-operation-index vector f, a problem-index-profit matrix Mp producing module 1103 that forms a matrix Mp correlating problem indexes with profit, a problem-index-plan-of-measures matrix Mm producing module 1104 that forms a matrix Mm correlating problem indexes with the plans of measures, a linear programming process engine 1105 and an external input/output device 1106. The linear programming process engine 1105 performs processing of computing profit relative to the amount of investment with respect to the selected plans of measures so as to select plans of measures, by which the computed profit becomes equal or larger than the target profit. The external input/output device performs processing of accepting externally input data and processing of outputting a screen, result of processing and the like. Further, the system shown in FIG. 6 comprises a control unit 1111 and a data storage device 1500 for recording and maintaining various kinds of data. The control unit 1111 performs controlling processing of respective processing modules, processing of input/output of data, and processing of recording data.

In the present embodiment, the system is realized by causing a computer of the information processor 100 to execute functions of the above-mentioned respective modules 1101, 1102, 1103, 1104 and 1106, and the linear programming process engine 1105 in accordance with the program. However, the present invention is not limited to this embodiment. A hardware source independent from the computer 110 may execute any or all of these modules and engine.

The data storage device 1500 represents a logical space for storing data. In fact, data are stored in an external memory unit 150 constituting a physical space for storing data and in a random access memory (RAM) 113. The data storage device 1500 comprises an analysis data area 1501 for storing the data to be analyzed, a work data area 1502 for storing data used at the time of respective operations such as analysis and formation of plans of measures, and a basic data area 1503 for management reforms, which stores basic data used for forming plans of measures for management reforms.

Next, various kinds of data necessary to form plans of measures for management reforms in manufacturing industries in this embodiment will be explained. The necessary data include data corresponding to the status data A which have to be input by a user U, data corresponding to the reference data B, and data which are previously provided in the system.

It is provided with a structure for accumulating the status data A. Input of the status data A is accepted through an input screen mentioned later. In the case where the status data A are gotten in from the business operation system 20, and the data structure used in the business operation system 20 and those which can be used in the system of the present embodiment are different to each other, the data from the business operation system 20 are gotten in the system after conversion into the data structure usable in the system. The data corresponding to the status data A include category-of-business data A10 indicating the category of business to which the subject enterprise belongs as shown in FIG. 8, losing-order-factor data A20 indicating factors of losing an opportunity to gain an order as shown in FIG. 9, extraordinary-loss-factor data A30 indicating factors which cause extraordinary loss as shown in FIG. 10, cost-structure data A40 indicating cost structure as shown in FIG. 11, and index data A50 as shown in FIG. 12. These data A10 to A50 are stored in the analysis data area 1501 in the data storage device 1500 as shown in FIG. 6. Here, FIGS. 8 to 16 (explained later) show schematically a structure in which respective data are stored. Also, it may be said that FIGS. 8 to 16 indicate a format for displaying respective data.

The category-of-business data A10 as shown in FIG. 8 are set at the time of using the service of assisting in forming plans of measures. In the example shown in FIG. 8, only one row is described since there is one kind of category of business to which the subject enterprise belongs. When the subject enterprise belongs to plural categories of business, plural rows are described. The category-of-business data A10 may be input every time when processing of forming plans of measures is performed. The category-of-business data A10 comprises major divisions and minor divisions. In the example of FIG. 8, it is recorded that the subject enterprise belongs to manufacturing industries (major division) and high-technology product assembling industries. (minor division).

In the losing-order-factor data A20 as shown in FIG. 9, only one item, i.e. delay of presenting an estimate is indicated as a losing-order factor. However, when a plurality of problems are extracted by benchmarking or the like, there may be a plurality of factors corresponding to the problems. The losing-order factor, and effect of a losing-order-factor to □V that corresponds to the number of products which could not be sold because of passing up an opportunity to gain an order thereof by the losing-order factor, is defined by as a relational expression. When the volume of sales (e.g. quantity of sales) in the current period relative to that in the previous period represents □V, a time period of presenting an estimate □LTq and a conversion factor therebetween □, the relational expression is expressed as follows:

$$\square V=\square\cdot\square LTq \qquad (5)$$

Figure 17:
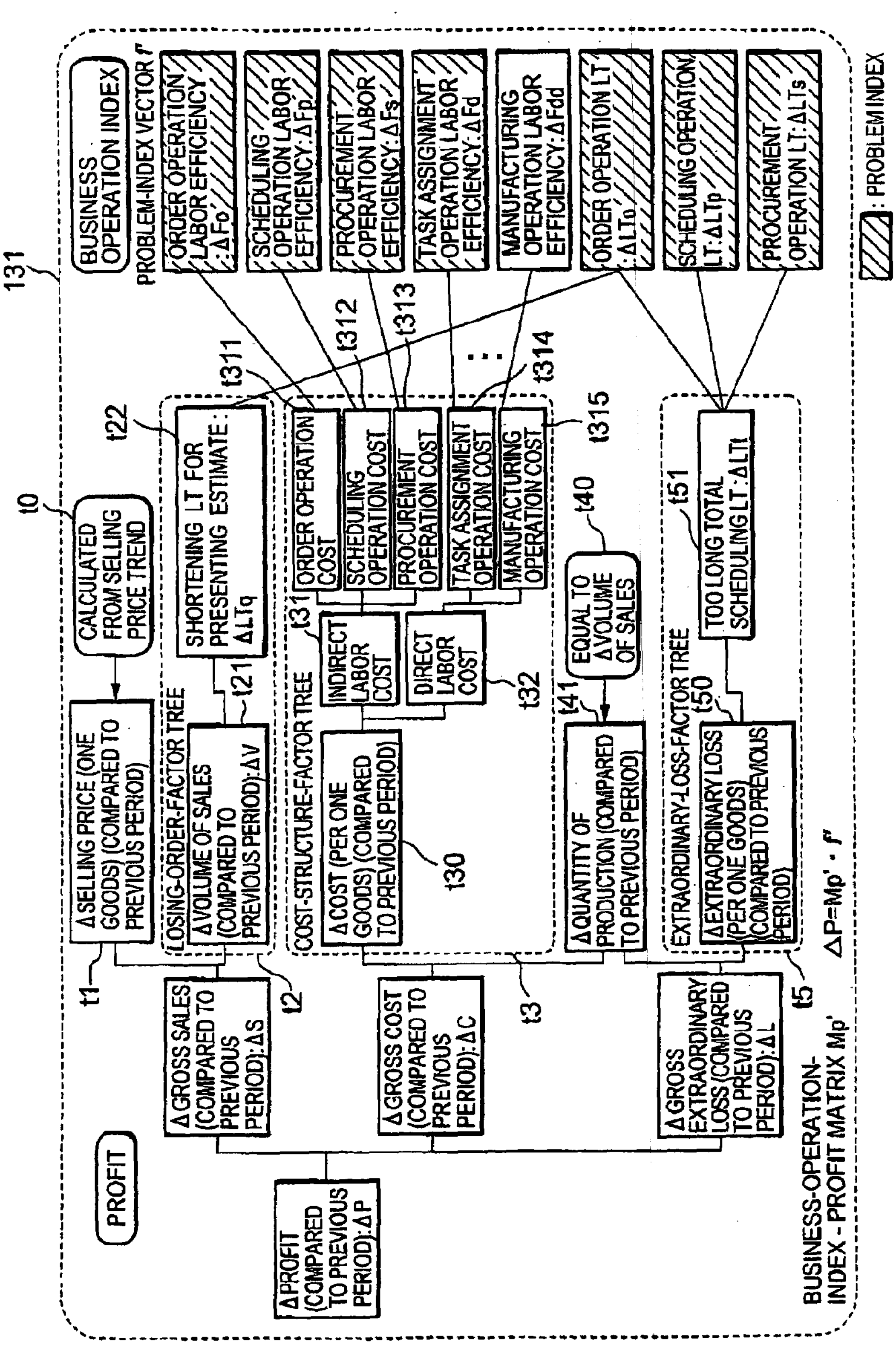
FIG. 17 is an explanatory diagram more specifically showing the relationship between profit and business operation indexes on the basis of the relationship between profit and plans of measures.

In this relational expression, as shown in FIG. 17, the time period of presenting an estimate is correlated with an order operation lead time, □LTo, of the business-operation-index vector f. Therefore, the losing-order factor is correlated with the business-operation-index vector f via the time period of presenting an estimate.

In the extraordinary-loss-factor data A30 shown in FIG. 10, too long scheduling total lead-time, LT, which is the total lead-time for the scheduling operation, is indicated as an extraordinary-loss factor. Effect of the too long scheduling total lead time, LT to □L, which indicates a ratio of the extraordinary loss in the current period relative to that in the previous period, is defined as a relational expression. When an extraordinary loss represents □L, a lead time □LTt and a conversion factor therebetween α, the relational expression is expressed as follows:

$$\square L=\square\cdot\square LTt \qquad (6)$$

In this relational expression, as shown in FIG. 17, the too long scheduling total lead time is correlated with an order operation lead time, □LTo, a scheduling operation lead time, □LTp, and a procurement lead time, □LTs, of the business-operation-index vector f, respectively.

The cost-structure data A40 as shown in FIG. 11, lists various items of expenses which constitute the cost for product of the subject enterprise. In the example of FIG. 11, major items of expenses include, for example, overhead cost, dispatch cost, direct labor cost, direct material cost, total cost, operating profit, extraordinary loss, and profit of current period. Also, minor items of expenses include, for example, order/shipment operation cost, scheduling operation cost, procurement operation cost, product shipping cost, task assignment operation cost, and manufacturing operation cost. These items of expense correspond to tree elements in the cost-structure-element tree as shown in FIG. 5.

The index data A50 as shown in FIG. 12 includes various indexes indicating the operating effectiveness and the like of the business operation processes in the subject enterprise as business-operation indexes. In the example of FIG. 12, major items include, for example, indirect labor efficiency (shipping quantity/man), direct labor efficiency (shipping quantity/man), and indirect labor lead time (number of days/time). Minor items include, for example, order/shipment operation labor efficiency, □Fo, scheduling operation labor efficiency, □Fq, procurement operation labor efficiency, □Fs, task assignment operation labor efficiency, □Fd, manufacturing operation labor efficiency, □Fdd, order/shipment operation lead time, □LTo, scheduling operation lead time, □LTp, and procurement operation lead time, □LTs. These items are elements of the business-operation-index vector f as shown in FIG. 5.

Next, data equal to the reference data B include cost-item-benchmark data B10 as shown in FIG. 14, and index-benchmark data B20 as shown in FIG. 15. These data describe the best practice in other enterprises or market places for respective rows. The cost-item-benchmark data B10 correspond to the cost-structure data A40 as shown in FIG. 11, and the index-benchmark data B20 to the index data A50 as shown in FIG. 12.

A selling price trend data S10 as shown in FIG. 13 describe relative selling prices of the product in the previous period and the second previous period when the selling price of the product in the current period is "1". These relative selling prices are determined from computation with reference to the selling price in the current period by the system. Alternatively, they may manually be input through the input device 120.

Plan-of-measures data S20 as shown in FIG. 16 comprises a plurality of plans of measures S21 applicable to the subject enterprise. In this example, plan-of-measures data S20 includes, as information, investment cost S22 and risk level S23 for each plan of measures S21.

All of the above-mentioned data B10, B20, S10 and S20 are stored in the basic data area 1503 for management reforms in the data storage device 1500. In the basic data area 1503 for management reforms, in addition to the above-mentioned data, an business-operation-index vector (general business-operation-index group) f, a plan-of-measures vector x (general plan-of-measures group), a matrix Mp composed of indexes and profit, and a matrix Mm composed of indexes and plans of measures. When an amount to be dealt with herein is a vector quantity, there is a case where it is referred to apparently as, for example, "an business-operation-index vector f".

Figure 24:
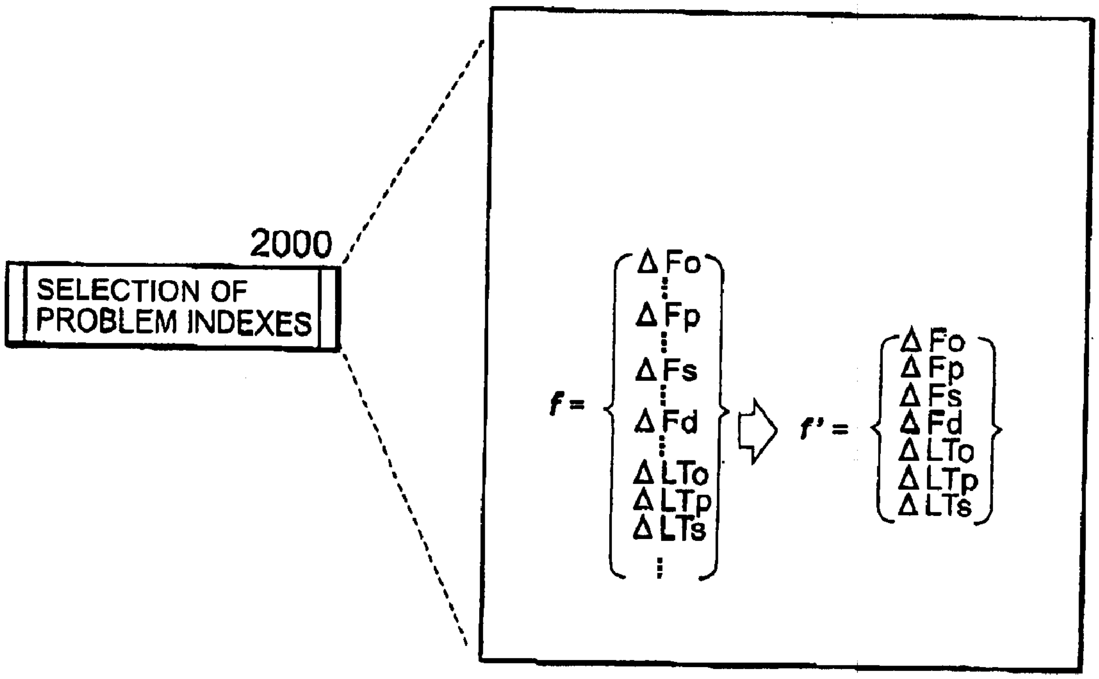
FIG. 24 is an explanatory diagram indicating the state that problem-index vector f' is selected from general business-operation-index vector f.

Here, as shown in FIG. 24, the general business-operation-index vector f comprises indexes representing degree of performance (efficiency) in the operation processing, such as the order/shipment operation labor efficiency, □Fo, the scheduling operation labor efficiency, □Fp, . . . , and the procurement operation lead time, □LTs. The general business-operation-index vector f is determined in accordance with the empirical rule in the category of business and previously prepared in the system side.

The general business-operation-index vector f has the following constitutions:

$$\square P = Mp \cdot f \qquad (7)$$

$$\square S = Ms \cdot f \qquad (8)$$

$$\square C = (Mc + Mr) \cdot f \qquad (9)$$

$$\square L = Ml \cdot f \qquad (10)$$

$$\square P = (Ms + Mc + Mr + Ml) \cdot f \qquad (11)$$

where,

Ms: matrix of losing-order-factor tree

Mc: matrix of cost-structure-factor tree

Mr: matrix of manufacturing-unachievable-factor tree

Ml: matrix of extraordinary-loss-factor tree

In a problem-index-selection processing (Step 2000 in FIG. 23), a problem-index vector f', for the problem which plans of measures should be formed, is selected from the general business-operation-index vector f.

Namely, the problem-index vector f' is selected from the business-operation-index vector f by means of comparing the cost-item-benchmark data B10 as shown in the above-mentioned FIG. 14 with the cost-structure data A40 as shown in FIG. 11, or the index-benchmark data B20 as shown in FIG. 15 with the index data A50 as shown in FIG. 12.

In FIG. 17, the relationship expressed by the above-mentioned equation (2) is described in the form of tree-structured diagram:

$$\square P' = Mp' \cdot f'$$

FIG. 17 schematically shows the relationship expressed by the equation (2), however, it can be displayed on a display unit in the form of such a tree structure. Here, t0 to t51 in FIG. 17 denote elements in the tree. In the lower layer of the tree, there exists elements t311 to t315. Further, the elements in the lower layer of the tree and the problem-index vectors f' are linked to each other with lines to visualize the relationship therebetween. It would is understood that the tree of FIG. 17 is narrowed in the elements compared to the generalized tree of FIG. 5.

Figure 18:
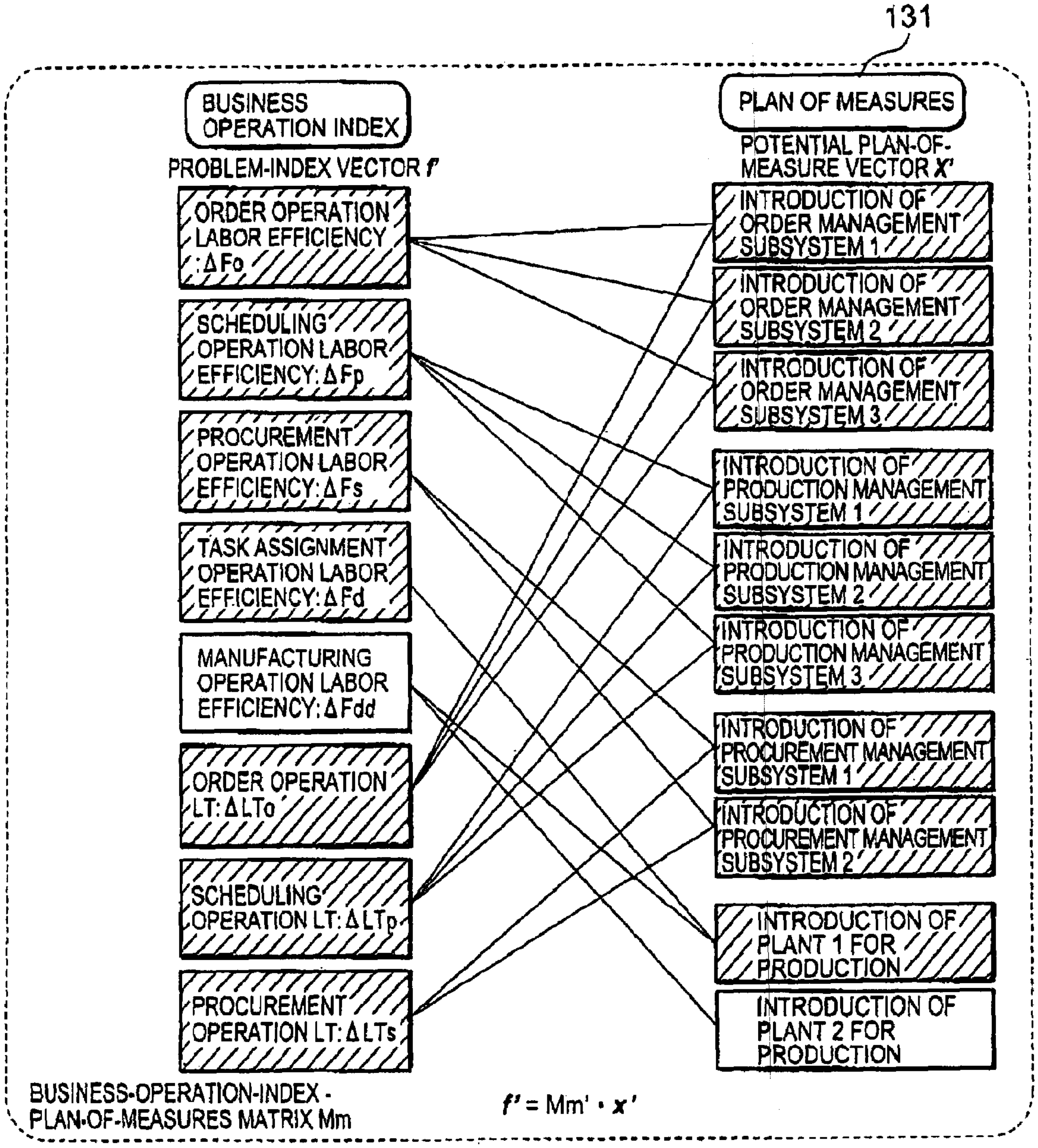
FIG. 18 is an explanatory diagram schematically showing the relationship between business operation indexes and plans of measures.

FIG. 18 shows schematically the relationship between the business-operation-indexes and the plans of measures. In FIG. 18, the above-mentioned problem-index vector f' and the plan-of-measures vector x' corresponding thereto are correlated to each other by the above-mentioned business-operation-index-plan-of-measures matrix Mm as shown in the equation (4). Namely, the problem-index vector f'is associated with the plan-of-measures vector x' through the relational expression (4):

$$f' = Mm' \cdot x'.$$

The link relationship as shown in FIG. 18 may be displayed on the display unit 130 as a screen 131 indicating the correlation. Similarly, the tree-structured diagram as shown in FIG. 17 can also be displayed as the screen 131.

Figure 6:
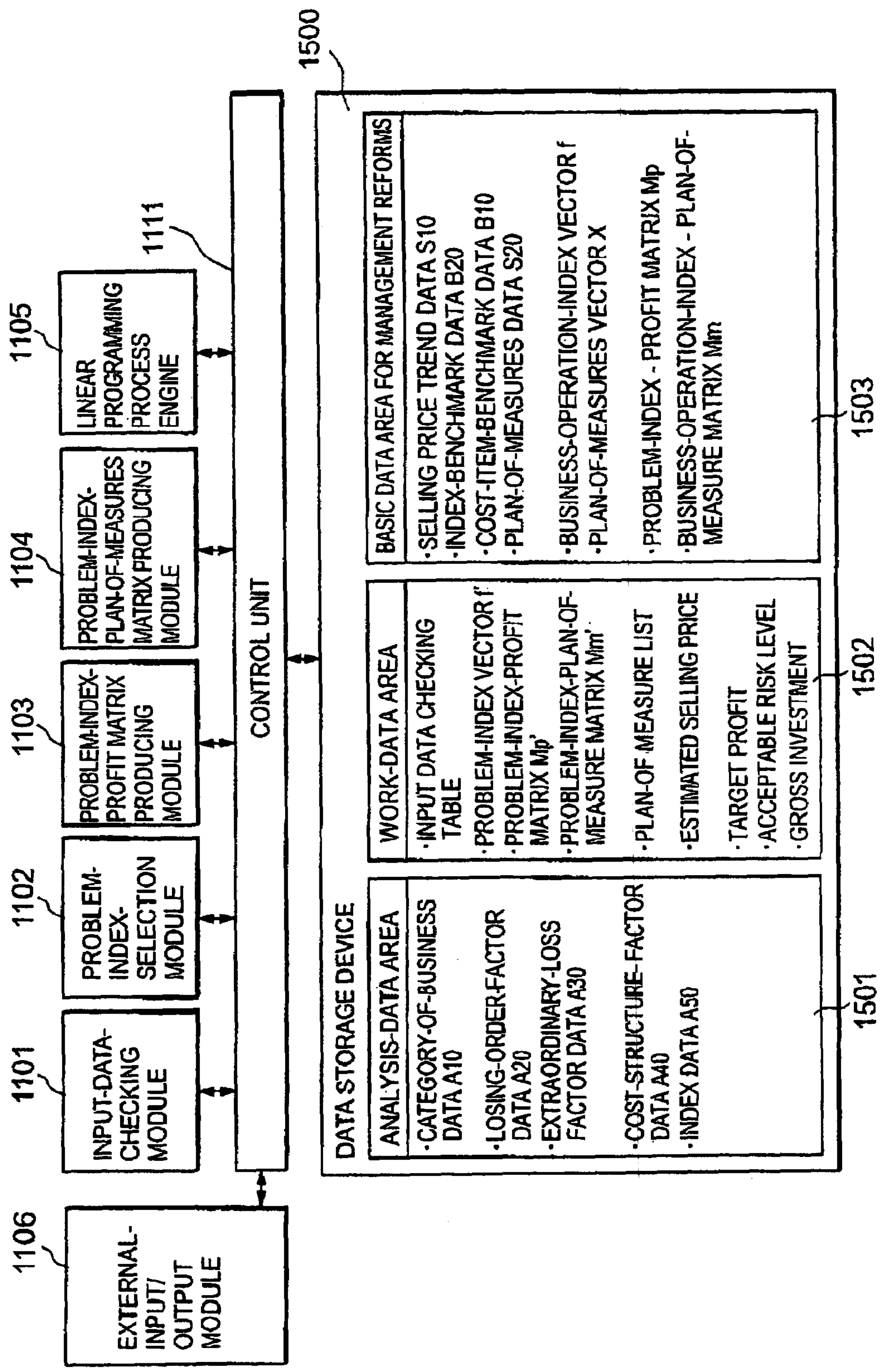
FIG. 6 is a block diagram showing a functional constitution of the system of assisting in forming plans of measures, which is used in the present embodiment.

All of the above-mentioned problem-index vector f', a problem-index-profit matrix Mp', and a problem-index-plan-of-measures matrix Mm' are stored in the work data area 1502 of the data storage device 1500 as shown in FIG. 6. The work data area 1502 stores, in addition to the above-mentioned data, various kinds of data such as an input data checking table, a list of plans of measures, an estimated selling price, target profit, an acceptable risk level, and gross investment.

Figure 19:
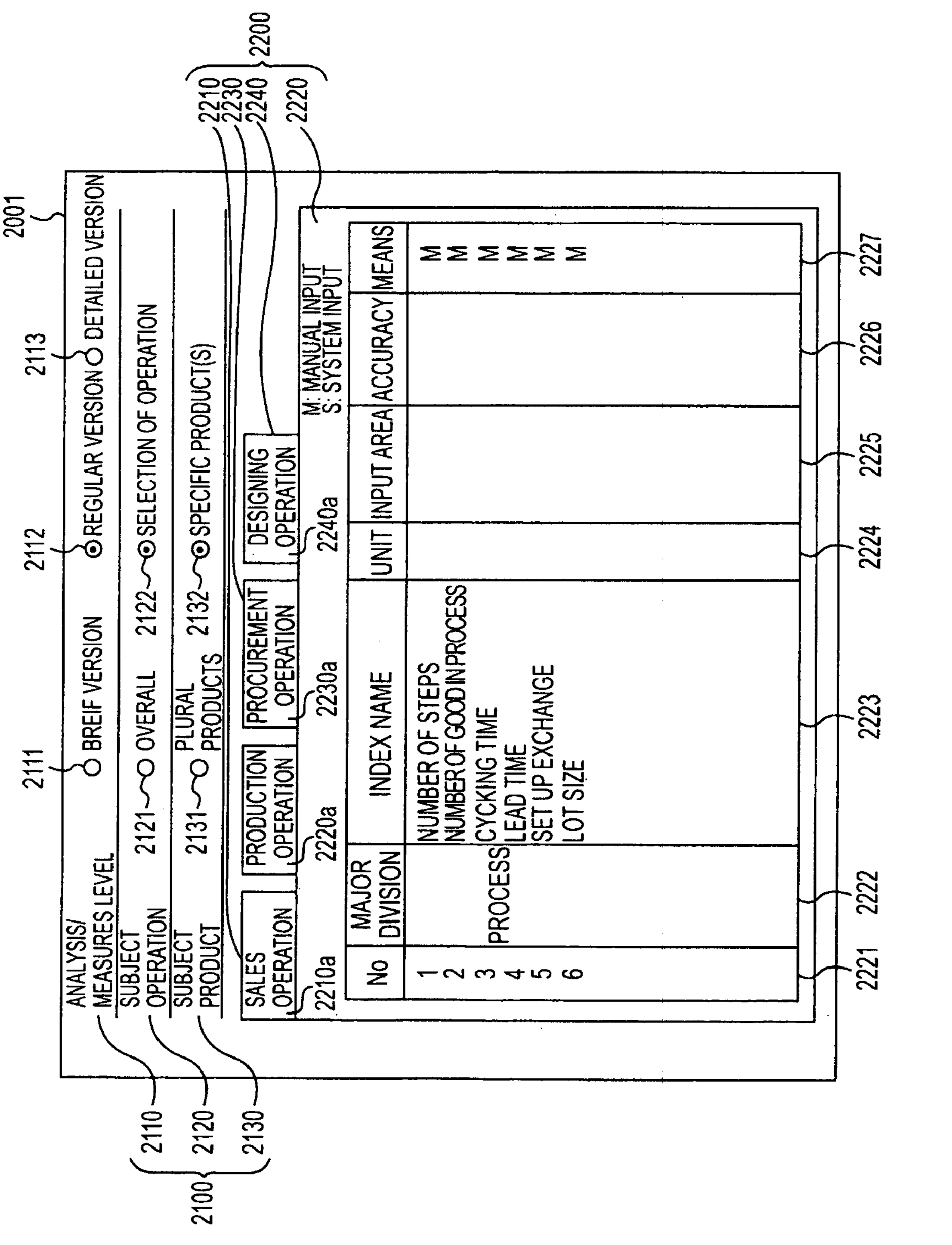
FIG. 19 is an explanatory diagram showing an example of the input screen through which a variety of settings are accept when using the service of assisting in forming plans of measures.

Here, the input data-checking table is a checklist fixing a range of data to be input, i.e. input items. The input data-checking table comprises items to be input and flag areas corresponding thereto. As shown in FIG. 19 described later, when plural detail levels are set for analysis and formation of plans of measures, degree of details of items to be input vary depending upon the level. Accordingly, a plurality of input data checking tables having items to be input, which correspond to the detail level designated through the input screen as shown in FIG. 19 explained later, are previously prepared. In the flag area corresponding to the item which has already been input, "1" is set.

Next, examples of an input screen through which a user U inputs necessary data, and which is processed by an external input/output module 1106, and an output screen viewed by the user U will be explained with respect to FIGS. 19, 20 and 21.

FIG. 19 shows an example of an input screen through which various designations necessary for using the service to assist in forming plans of measures are performed, as one of screens displayed on the display unit 130. In an input screen 2001 as shown in FIG. 19, a service-designation field 2100 for inputting items necessary to designate which service to assist in forming plans of measures is used, and a data input field 2200 for inputting data necessary to utilize the service are displayed. In the example of FIG. 19, the service-designation field 2100 and the data input field 2200 are displayed together on one screen. However, the present invention is not limited to this example. The service-designation field 2100 and the data input area 2200 may be displayed as separate screens. The respective areas may further be fragmented to display as separate screens.

In the service-designation field 2100 of the present embodiment, a level-designation field 2110 for designating the detail levels of analysis and forming plans of measures, a subject-operation field 2120 for designating a category of the operation for which plans of measures are required, and a subject product-designation field 2130 for designating a subject product for which plans of measures are required. In this embodiment, the category of business for which plans of measures are provided has already been designated to manufacturing industries so that no area for designating category of business is shown. When intended to select plural categories of business, an area for selecting category of business is further displayed.

In the level-designation field 2110 for designating the detail levels of analysis and formation of plans of measures, three detail-level buttons are displayed as options. Namely, a "brief (stripped-down) version" button 2111 briefly proposing plans of measures, a "regular version" button 2112 proposing plans of measures in a regular detail level, and a "detailed version" button 2113 proposing detail plans of measures are displayed as options. The option is selected by clicking any one of option buttons in front of texts indicating options with a mouse 122. In this example, the "regular version" button 2112 is selected as a default value. These detail levels of measures are different to each other in, for example, the amount of information to be used. Namely, when analysis is carried out on the basis of a limited amount of information to propose plans of measures, the results can be obtained rapidly. However, sufficient degree of accuracy is not always obtainable. When it may take much time to obtain the result, the detailed version can be selected to obtain the measures with good accuracy.

In the subject-operation field 2120, an "overall" button 2121 to be selected when plans of measures are required for overall subject operations, and a "selection of operations" button 2122 for selecting a specific category of operation are displayed as options. By clicking either option button, selection of the option is carried out. In this example, the "selection operations" button 2122 is selected as the default value.

The subject product-designation field 2130 is a field used for designating distinction of which the manufacturing process to be reformed manufactures, plural kinds of products or only a specific product (or a specific group of products). For distinction thereof, a "plural" button 2131 for designation of plural kinds of products and a "specific product(s)" button 2132 for designation of a specific product or a specific group of products are displayed as options.

The data input field 2200 provides fields for inputting data relating to respective operations previously set for a subject enterprise. In the example of FIG. 19, as the operations, sales operation 2210, production operation 2220, procurement operation 2230, and designing operation 2240 are prepared. For each operation, tabs 2210*a*, 2220*a*, 2230*a* and 2240*a* are provided, and the corresponding name of each operation is displayed. A computer 110 displays the selected operation tab in front of the other operation tabs such that data relating to the selected operation can be input. In the example of FIG. 19, the production operation 2220 is selected.

In the example shown in FIG. 19, since the "selecting operation" button 2122 is selected in the subject-operation field 2120, a plurality of tabs are displayed on the data input field in a selectable manner. Subsequently, when any one of operations is selected and data input is completed, the screen 2001 closes. On the other hand, when the "overall" button 2121 is selected in the subject-operation field 2120, all tabs of the operations displayed on the data input field 2200 accepts the input of data. Subsequently, when data input to all tabs of the operations is completed, the screen 2001 closes.

In the data input field 2200, a framework for inputting data, for example, a form of table, is previously prepared. The example as shown in FIG. 19 shows the state for accepting input of data with respect to the production operation 2220*a*. In this example, areas of "number" 2221, "major division" 2222, "index name" 2223, "unit" 2224, "input area" 2225, "accuracy" 2226 and input "means" 2227 are displayed. On this screen, the area into which a user U has to input is only the "data input" area 2225. Input of data (e.g. a numerical value) concerning an index, which is indicated in the "index name" area 2223 into the "input area" 2225, is accepted through an input device 120.

Here, the notation in the input "means" area 2227 will be explained. A letter "M" indicates an item into which data have to be manually input via the input device 120. Although the case is not shown in FIG. 19 where there is an indication of letter "S" in the input "means" area, the letter "S" shows that data has been automatically input in the "input area" 2225 by the information processor 100. In this case, no input of data is required.

The information processor 100 may be linked with, for example, a manufacturing management system or an accounting system. In this case, if these operation systems have data corresponding to the index, the information processor 100 takes therein their data. Therefore, the corresponding data are automatically indicated in the "input area"

2225. Further, the letter “S” is described in the corresponding column of the input “means” area 2227.

The information processor 100 may have the above-mentioned input data checking module 1101 as the function to check data input to the “input area” 2225, with respect to, for example, necessary data are input?, the type of data is right?, the a magnitude of data is adequate?, or the like. Accordingly, when input data, the input data checking module 1101 performs data checking processing.

Figure 20:
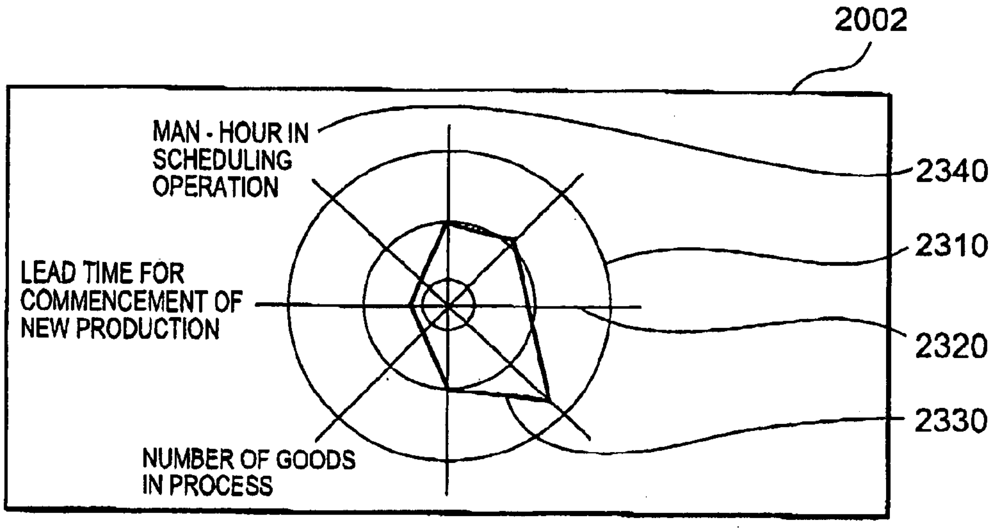
FIG. 20 is an explanatory diagram showing an example of the screen on which the analysis result with respect to problem indexes is displayed.
Figure 21:
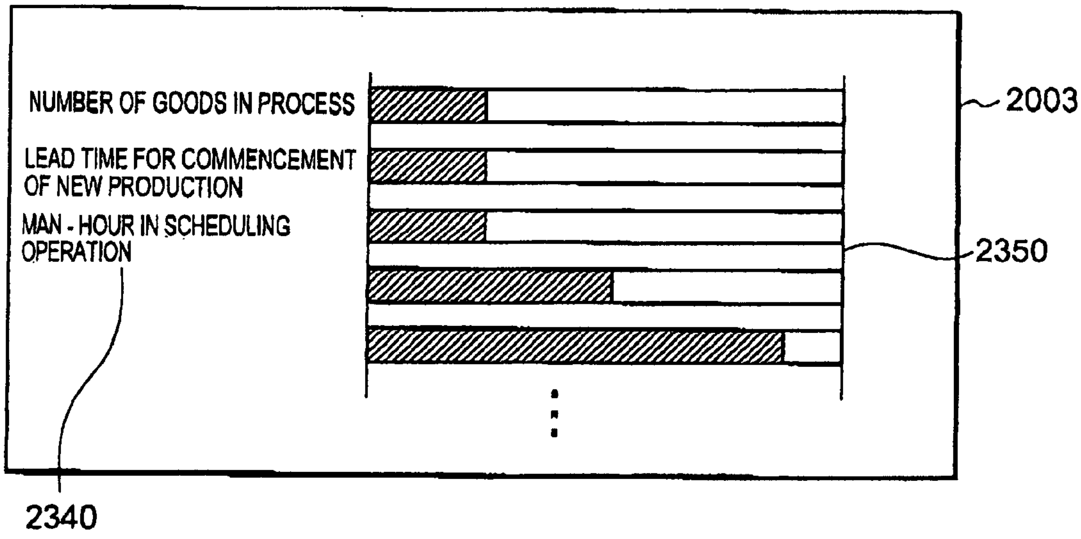
FIG. 21 is an explanatory diagram showing another example of the screen on which the analysis result with respect to problem indexes is displayed.

FIGS. 20 and 21 show examples of the screens indicating the analysis result with respect to problem indexes. FIG. 20 is an example of the output screen 2002 indicating a graph referred to as a radar chart. FIG. 21 is an example of the output screen 2003 displaying a bar chart indicating values with respect to problem indexes.

In the radar chart of FIG. 20, a circle 2310, a plurality of line segments 2320, each of which is allocated an index and which extend from the center of the circle 2310 to the direction of the radius thereof, a graphic pattern 2330 which is made with line segments connecting values of each axis, and indication of respective indexes 2340 are shown. By the display of the radar chart, a user U can know the matters to be reformed, i.e. the weak part of the subject enterprise. FIG. 21 shows a bar chart 2350. For example, the number of goods in process, lead-time for commencement of new production and the like are indicated.

Next, procedure of the processing in the present embodiment will be explained with reference to the drawings. Here, it is assumed that the program P for assisting in forming plans of measures is installed in a computer 110. Further, it is assumed that various data in the basic data area 1503 for management reforms including the reference data B, as shown in FIG. 6, and various necessary data in the work data area 1502 has already been stored in the data storage device 1500.

As shown in FIG. 4, in the present embodiment, analysis of business management (Step 1000), selection of problem indexes (Step 2000) and selection of plans of measures (Step 3000) are performed. More concretely, the analysis of business management 1000 is processed with in accordance with a procedure shown in FIG. 22. Also, Step 2000 and Step 3000 are processed with in accordance with a procedure shown in FIG. 23. Here, when the analysis is not needed, the processing from Step 2000 may be done, and when the problem indexes have been known, the processing from Step 3000 may be done.

Figure 22:
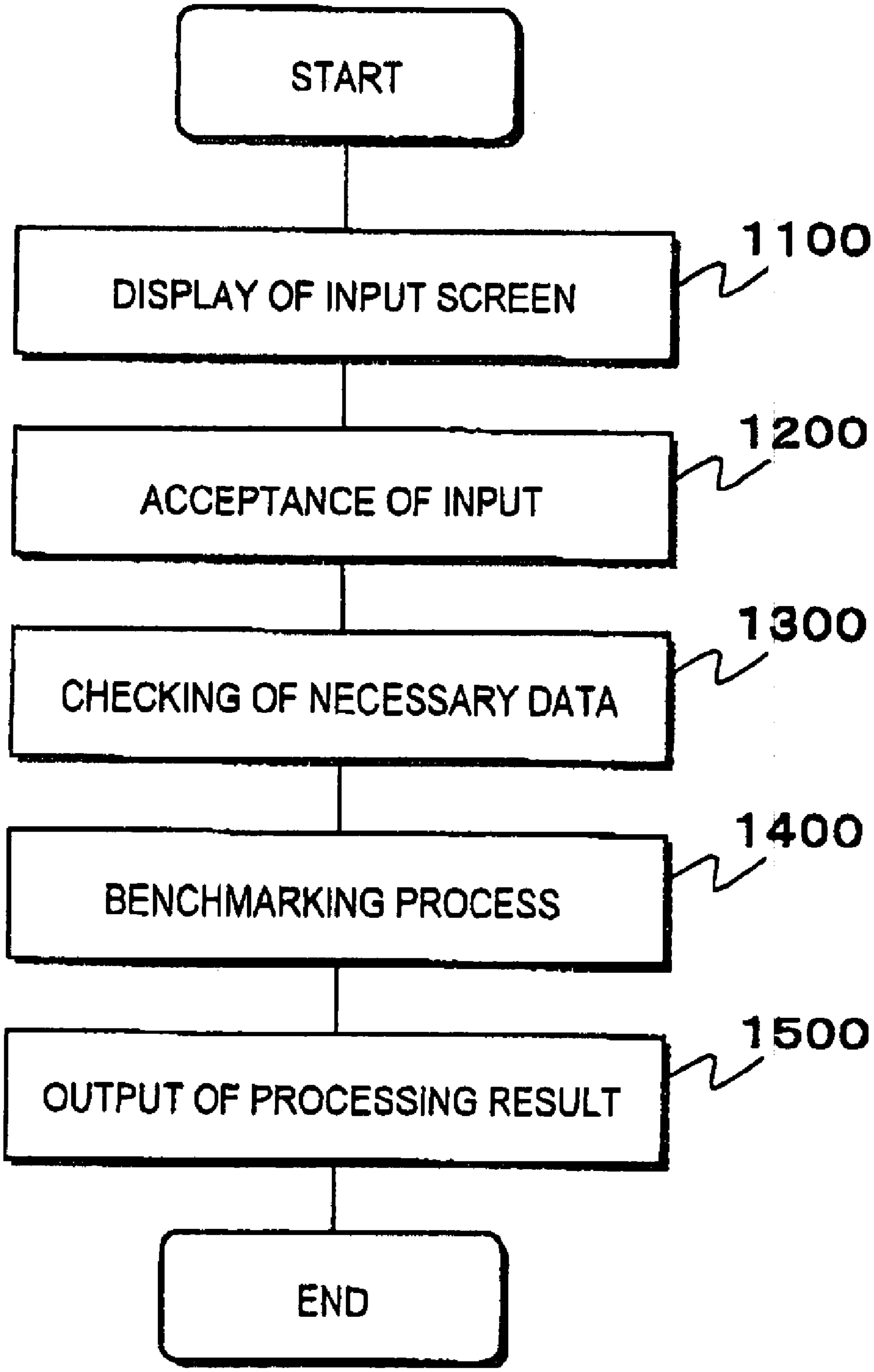
FIG. 22 is a flow chart indicating the procedure for analyzing business management.

Processing of the analysis of business management is performed in accordance with a flow shown in FIG. 22. The computer 110 displays the screen shown in the above-mentioned FIG. 19 (Step 1100) through the external input/output module 1106 shown in FIG. 6 so as to accept input of data and instructions for selection of the problem indexes (Step 1200). Further, it is checked whether necessary data are input (Step 1300).

In the present embodiment, it is supposed that the basic data for management reforms including the reference data B are previously stored in the computer 110. However, for example, when the reference data B are not yet taken in the computer 110, a message to prompt to take therein the data is output to a display unit in Step 1300. Further, when data of the business operation system 20 can be used, and when the data has already been input, no data input is needed. When data of the business operation system are taken therein, a letter “S” is indicated in the column of the input “means” area 2227 shown in FIG. 19 in place of a letter “M”. Of course, it is possible to change a value that has been already input.

At the state that necessary data has been input, analysis is carried out by benchmarking (Step 1400). Namely, the cost-structure data A40 shown in FIG. 11 and the cost-item-benchmarking data shown in FIG. 14 are compared to each other in numerical values of the corresponding items with respect to, for example, a ratio of sales amount, in this embodiment. Then, items inferior to the best practice are extracted. In this case, flexibility for judgement is previously set for each item. Although values indicating flexibility are not shown, a file which stores the values are previously set up. Similarly, the index data A50 shown in FIG. 12 and the index-benchmark data B20 shown in FIG. 15 are compared to each other in numerical values of the corresponding items with respect to, for example, index values, in this embodiment. Then, items inferior to the best practice are extracted. In this case, flexibility for judgement is also previously set for each item. Further, a file which stores the values are previously set up.

The result of extraction is stored in the work data area as an analysis result. Output processing of the above-mentioned comparison result is performed (Step 1500). For example, the result is displayed on the display unit 130 in the form of a radar chart as shown in FIG. 20 or in the form of a bar chart as shown in FIG. 21. Thereby, a user U can visually recognize the problems on the business management of the subject enterprise.

Next, processing after selection of problem indexes will be explained. The procedure of the processing is shown in FIGS. 23 to 26B.

As shown in FIG. 24, problem-index-selection processing is carried out by causing a computer 110 to select a problem-index vector f' from the general business-operation-index vector f. The problem-index-selection module 1102 processes the selection of problem-index vector f'. In this selection, the problem-index vector f' relating to the items extracted in the above-mentioned analysis are selected. The selection can automatically be done on the basis of the analysis result of the problem indexes. Of course, a user U can also conduct the selection through an input device 120 with reference to the result shown in the above-mentioned FIGS. 21 and 22.

Next, the following relational expression between the problem-index vector f' and the profit □P' is produced (Step 3100 in FIG. 23):

$$\square P'=Mp'\cdot f'.$$

Figure 25:
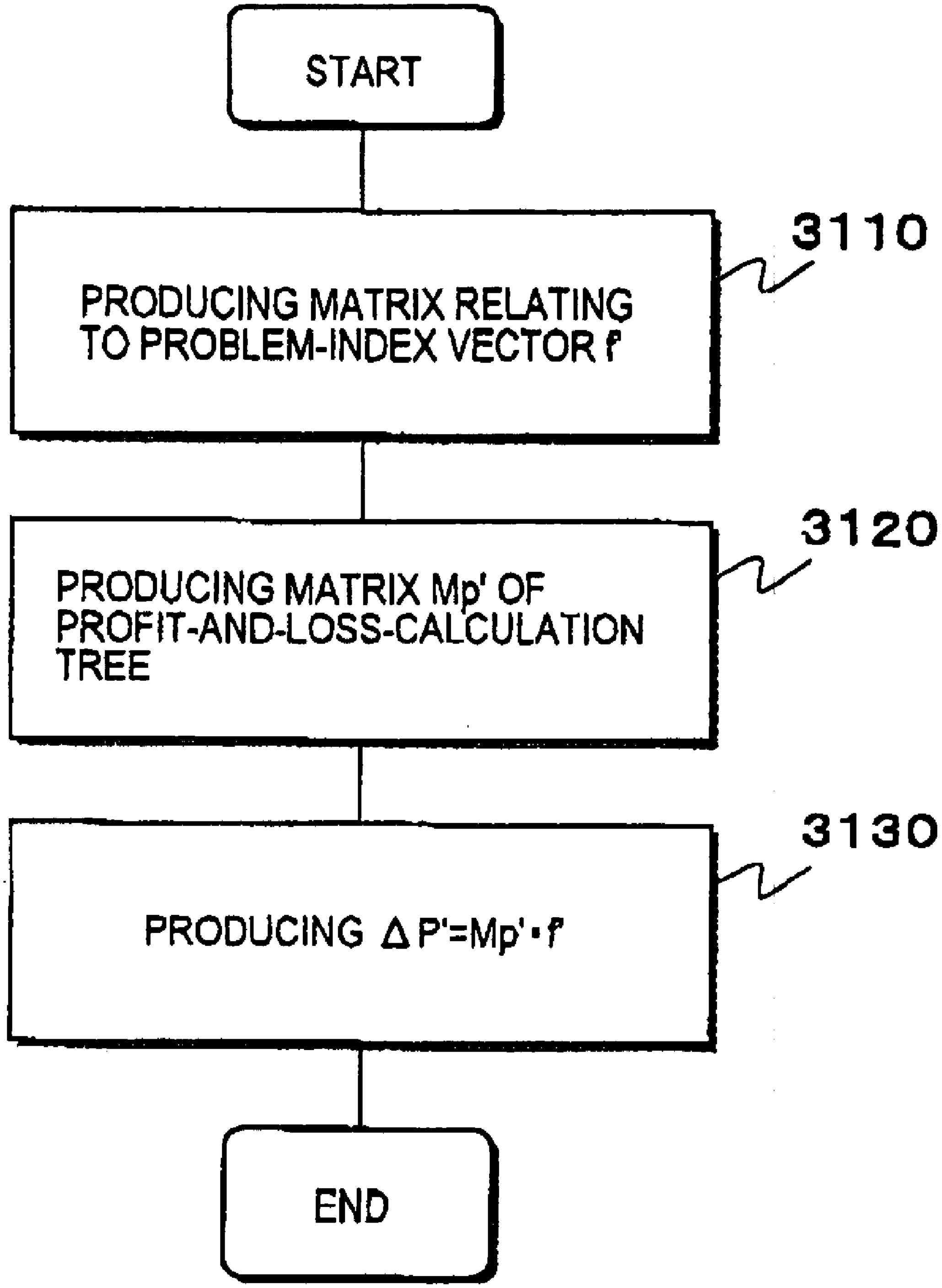
FIG. 25 is a flow chart indicating the procedure for producing a profit-problem-index matrix Mp'.

Namely, a problem-index-profit matrix Mp' is produced (Steps 3110 to 3130 in FIG. 25). The matrix Mp' is produced by extracting elements relating to the problem-index vector f' from the matrixes represented by the above-mentioned relational expressions (7) to (10). As an example, a matrix Ms will be explained with reference to FIGS. 25, 26A and 26B. The problem-index-profit matrix Mp' producing module 1103 executes this processing.

Figures 26A, 26B:
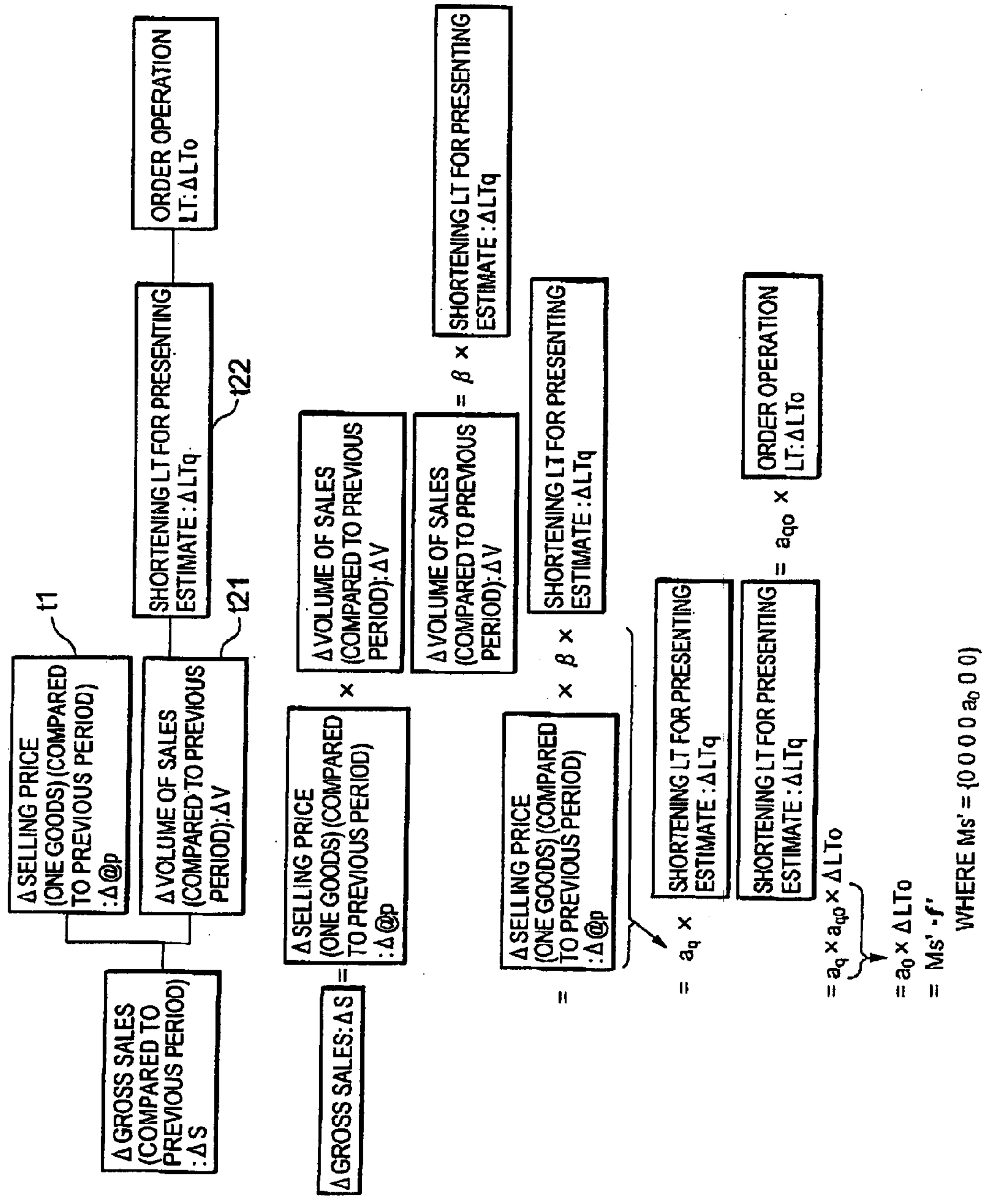
FIG. 26A is an explanatory diagram showing a portion of tree relating to Δgross sales (ΔS) and the problem indexes relating thereto, both of which are extracted from the tree shown in FIG. 17.
FIG. 26B is an explanatory diagram showing procedure by which a matrix Ms relating to the losing-order-factor tree is produced on the basis of the relationship between the extracted tree portion and the problem indexes.

In the above-mentioned analysis result, the order/shipment operation lead-time LT is contained in the indexes elected as the problem-index vector f'. Then, FIG. 26A shows a portion of the losing-order-factor tree, which relates to the order/shipment operation lead time LT and the matrix Ms. As shown in FIG. 26A, tree elements t1, t21 and t22 relate thereto.

As shown in FIG. 26B, gross sales □S represented by the product of a □selling price (□@p) computed from the selling price trend data S10 shown in FIG. 13 and a volume of sales □V of the content of the tree t21; namely, gross sales □S (compared to the previous period) which correspond to lost of order will be discussed. Here, the above-mentioned equation (5) is further substituted into □V since □V has the relationship of the equation (5). A product of the □selling price (□@p) and the coefficient β in the equation (5) is represented by aq. Further, when a coefficient is aqo, a lead time of presenting an estimate □LTq is expressed with the relating order/shipment operation lead time □LTo by the following equation:

$$\square S = aq \times aq0 \times \square LTo \quad (12).$$

Further, when the product of the above-mentioned aq and aq0 is a0, the following equation can be obtained:

$$\square S = a0 \times \square LTo \quad (13).$$

By the way, there is the following relationship:

$$\square S = Ms' \cdot f'.$$

Also, it is assumed that, as shown in FIG. 17, one problem index f' relates to one element in the matrix Ms', Ms' is expressed as follows:

$$Ms' = \{0\ 0\ 0\ 0\ a0\ 0\ 0\}.$$

Matrixes Mp', (Mc'+Mr') and Ml' can be obtained in the same manner.

Subsequently, a matrix for problem-index-profit, i.e. a matrix Mp' for profit-and-loss-calculation tree is made by using the matrixes Mp', Ms', (Mc'+Mr') and Ml' thus obtained (Step 3120). The matrix Mp' is expressed by the following equation:

$$Mp' = \{Mp'Ms'(Mc'+Mr')Ml'\} \quad (14).$$

Then, a relational expression of the problem-index vector f' and the profit □P' is determined as follows (Step 3130):

$$\square P' = Mp' \cdot f'.$$

Next, explanation will proceed with a processing for forming plans of measures. The problem-index-plan-of-measures matrix Mm producing module 1104 as shown in FIG. 6 performs this processing. First, a risk level is input as shown in FIG. 23 (Step 3210). The risk level is one of keys for selecting each plan of measures in the plans-of-measures data S20 as shown in FIG. 16. In this embodiment, it is assumed that the risk level is input to be "2 or lower".

Figure 27:
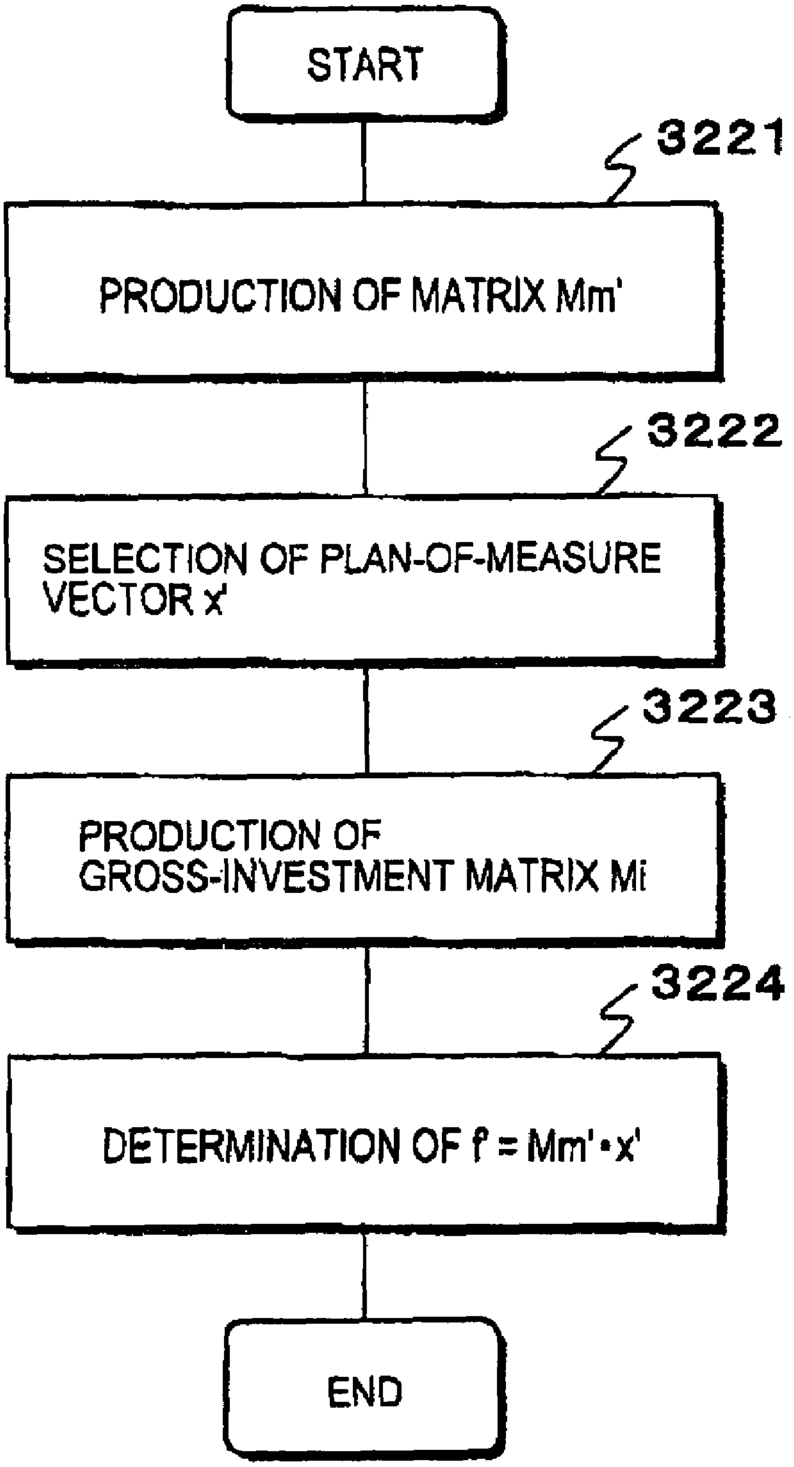
FIG. 27 is a flow chart indicating procedure for producing the relational expression between problem indexes and plans of measures.
Figure 28:
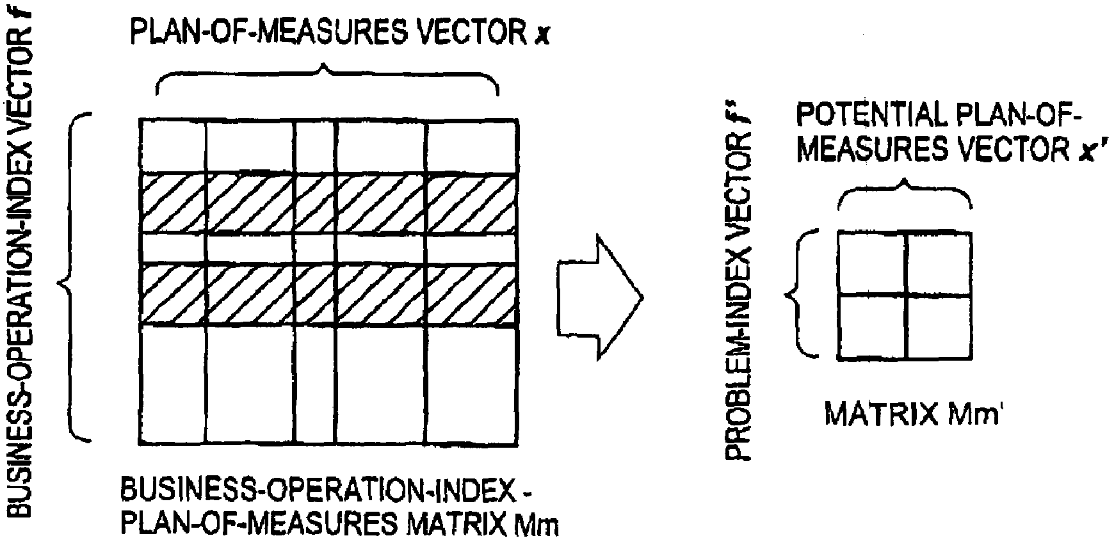
FIG. 28 is an explanatory diagram schematically showing the production of a problem-index-plans-of-measures matrix Mm' from a business-operation-index-plans-of-measures matrix Mm.

Then, a relational expression between the problem-index vector f' and the plan-of-measures vector x' is produced (Step 3220). Specifically, processing is carried out in accordance with the procedure shown in FIG. 27. First, on the basis of the business-operation-index-plan-of-measures matrix Mm, a problem-index-plan-of-measures matrix Mm' is produced. The rows relating to the problem-index vector f' selected as mentioned above are first picked up from the matrix Mm. Columns which have an element other than 0 in the respective rows picked up and whose risk levels are equal or lower than the designated level are extracted therefrom. The matrix Mm' is constituted by the extracted columns. FIG. 28 shows this processing schematically. As shown in FIG. 28, this processing produces the matrix Mm' correlating the problem index f' with the plans of measures X' from the matrix Mm which correlates the general business-operation-index vector f with the general plan-of-measures vector x.

Subsequently, plans of measures residing in the rows of the generated matrix Mm' are selected from the general plan-of-measures vector x as a potential plan-of-measures vectors x' (Step 3222). Specifically, as potential plans of measures, one or more plans of measures which correspond to the relative columns of the matrix Mm' are selected from the plans of measures stored in the plan-of-measures data S20 as shown in FIG. 16. In this case, the risk level is input to be "2 or lower" in Step 3210 so that plan-of-measures data Nos 1 to 9 in the plan-of-measures data S20 are selected. Namely, the potential plan-of-measures vector x' which is composed of 9 rows and 1 column having elements x1 to x9, as indicated in the following equation is obtained:

$$x' = \begin{Bmatrix} x1 \\ x2 \\ x3 \\ x4 \\ x5 \\ x6 \\ x7 \\ x8 \\ x9 \end{Bmatrix} \quad \ldots\ldots(15)$$

Next, on the basis of the investment costs recorded in the plan-of-measures data S20 as shown in FIG. 16, a gross-investment matrix Mi is produced (Step 3223). Namely, the investment cost with respect to the respective plan-of-measures data included in the potential plan-of-measures vector x' are picked up from the plan-of-measures data S20 in the arrangement of rows and columns of the plan-of-measures data S20 to obtain the following equation:

$$Mi = \{m1\ m2\ m3\ m4\ m5\ m6\ m7\ m8\ m9\}.$$

By the use of numerical values of the investment cost as shown in FIG. 16, the equation is expressed as follows:

$$Mi = \{5\ 7\ 3\ 10\ 10\ 10\ 3\ 10\ 10\}.$$

Next, a relational expression between the problem index and the plans of measures is produced (Step 3224). Here, by the use of the selected problem-index vector f', the produced matrix Mm' and the potential plan-of-measures vector x', the following relational expression is obtained:

$$f' = Mm' \cdot x' \quad (4)$$

where Mm' is represented by $$Mm' = \{mij\} 0 \leqq i \leqq 7\ 0 \leqq j \leqq 9.$$

Namely, Mm' is a matrix composed of 7 rows and 9 columns, which has mij as the elements.

By the use of the plan-of-measures data S20 as shown in FIG. 16, the relationship defined by the equation (4) is diagrammatically shown in FIG. 29. In FIG. 29, the correlation of the problem indexes 1 to 7 and the plans of measures 1 to 9 is indicated with the elements of the matrix Mm'. Further, processing variables {0, 1} corresponding to x1 to x9 are defined, respectively. The selected potential plan of measures include, for example, "introduction of order management subsystem 1", "introduction of order management subsystem 2", "introduction of order management subsystem 3", "introduction of production management subsystem 1", "introduction of production management subsystem 2", "introduction of production management subsystem 3", "introduction of procurement management subsystem 1", "introduction of procurement management subsystem 2" and "introduction of a plant for production".

The plan-of-measures vector x' is formed by the processing so far. The problem-index-plan-of-measures matrix Mm producing module 1104 causes a display unit 130 to display the obtained plans of measures through the external input/ output module 1106. Alternatively, the obtained plans of measures are printed out by a printer 140, when instructed externally.

In this stage, it is considered that a plurality of the plans of measures is selected. Namely, a plurality of the potential plans of measures is selected. Among these potential plans of measures, plans of measures to be executed are further selected. This embodiment has a function to assist in selecting the optimum plans of measures within the gross investment, as mentioned later. However, this selection can be done in accordance with a user's U opinion.

Next, processing of selecting the plans of measures to be executed, i.e. the optimum plans of measures, from a plurality of the potential plans of measures is performed.

In the flow of FIG. 23, the computer 110 accepts input of the gross investment (Step 3310). The gross investment is a gross amount of cost used for management reforms. The computer 110 also accepts input of the target profit. The input gross investment and target profit are stored in the work data area 1502 in the data storage device 1500 as shown in FIG. 6. The external input/output module 1106 performs the processing at this stage.

Figure 30:
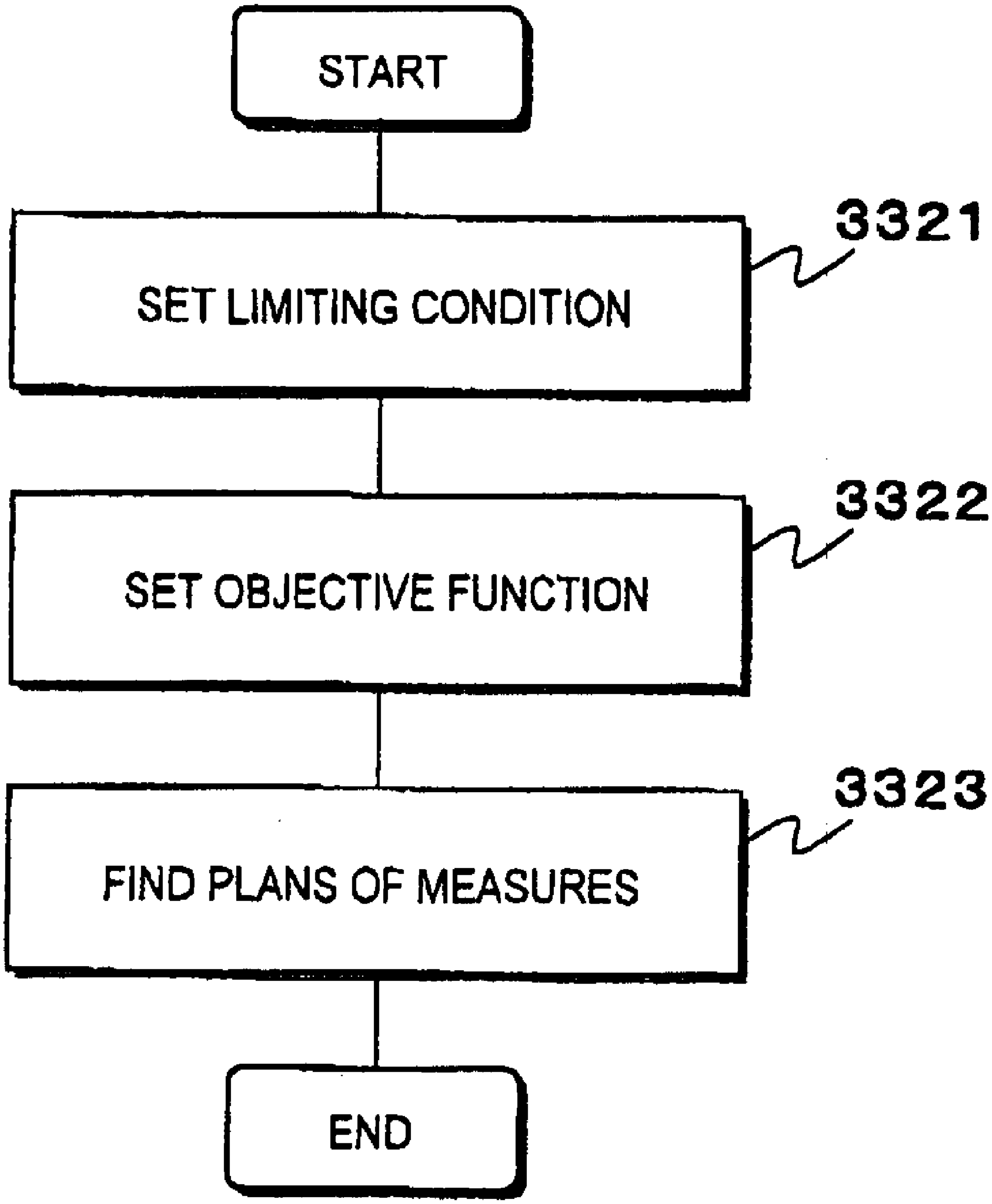
FIG. 30 is a flow chart indicating the procedure for selecting plans of measures to be executed from a potential plan-of-measures vector x'.

Next, the final plans of measures to be executed is selected from the potential plans of measures vectors x' (Step 3320). This process for selection is performed through the external input/output module 1106 and the linear programming process engine 1105 as shown in FIG. 6, in accordance with the procedure as shown in FIG. 30.

First, limiting conditions are set (Step 3321). It is assumed that there are two limiting conditions as follows:

(1) Gross investment Inv necessary to execute the each plan of measures is equal or lower than the input gross investment I.

(2) Each plan of measures is either "executed" or "not executed".

These conditions are expressed with equations as follows:

$$I>Inv$$

$$Inv=Mi\cdot x' \quad (16)$$

$$I>Mi\cdot x'$$

$$xj=\{0, 1\}.$$

Subsequently, an objective function is set (Step 3322). First, in consideration of:

$$\Delta P'=Mp'\cdot f' \quad (2) \text{ and}$$

$$f'=Mm'\cdot x' \quad (4),$$

the following equation is obtained:

$$\Delta P'=Mp'\cdot Mm'\cdot x' \quad (17).$$

Then, the equation (17) is set to be the objective function for obtaining plans of measures, which maximize □P'.

Next, the linear programming process engine 1105 performs a processing of linear programming. Namely, plans of measures are found which satisfy the limiting conditions and maximize the objective function (Step 3323). The equation (17) calculates the profit in the case where the each obtained plan of measures is employed.

It is examined whether the calculated profit is equal or larger than the target profit stored in the work data area 1502 of the data storage device 1500 (Step 3410). When the calculated profit is equal or larger than the target profit, the plans of measures are output (Step 3420). Note that the target profit may not be set. In this case, all of the potential plans of measures are output. Further, the target profit may be set to be "0". In this case, if the calculated profit is larger than 0, all of the plans of measures are output.

On the other hand, when the calculated profit is less than the target profit, the plans of measures, which do not satisfy the conditions in the preceding steps are output on the display unit 130 (Step 3430). Concurrently, a message that requires any one of instructions among that the gross investment is changed, that the risk level is changed, and that the processing is finished, is displayed on the display unit 130. Here, when finish of the processing is instructed, the processing finishes (Step 3440). On the other hand, after accepting the instruction to change the gross investment through the input device 120 (Step 3450), the processing from Step 3310 is performed again. Alternatively, when accepted the instruction to raise the risk level through the input device 120 (Step 3460), the processing from Step 3210 is performed again. These processing are repeated until plans of measures, which satisfy the conditions, are selected, or finish of the processing is instructed. Here, the external input/output module 1106 performs output of the plans of measures, output of the results of the processing, output of the message, acceptance of the instructions and the like.

Next, concrete examples of formation of plans of measures for management reforms as mentioned above will be shown.

As coefficients relating to the gross sales (compared to the previous period) ΔS, the below-mentioned a1, a2 and a3 are given. Further, as coefficients relating to the gross cost (compared to the previous period) ΔC, below-mentioned b1, b2 and b3 are given. Furthermore, as coefficients relating to the gross extraordinary loss (compared to the previous period) ΔL, the below-mentioned c1, c2 and c3 are given.

a1: coefficient of sales increase by decrease of the number of goods in process a2: coefficient of sales increase by decrease of the lead time for commencement of new production a3: coefficient of sales increase by decrease of man-hour in the scheduling operation b1: coefficient of cost-cutting by decrease of the number of goods in process b2: coefficient of cost-cutting by decrease of the lead time for commencement of new production b3: coefficient of cost-cutting by decrease of man-hour in the scheduling operation c1: coefficient of extraordinary loss by decrease of the number of goods in process c2: coefficient of extraordinary loss by decrease of the lead time for commencement of new production c3: coefficient of extraordinary loss by decrease of man-hour in the scheduling operation In addition, it is assumed that as individual problem index included in the problem-index vector f', a "ratio of decrease of the number of goods in process", a "ratio of decrease of the lead time for commencement of new production", and a "ratio of decrease of man-hour in the scheduling operation" have been determined.

By the use of the coefficients and ratios mentioned above, $$\Delta P'=Mp'\cdot f'$$

is given as follows:

$$\Delta P' = (a1\text{-}b1\text{-}c1\quad a2\text{-}b2\text{-}c2\quad a3\text{-}b3\text{-}c3)\begin{Bmatrix}\text{RATIO OF DECREASE OF NUMBER OF GOODS IN PROCESS}\\ \text{RATIO OF DECREASE OF LEAD TIME FOR COMMENCEMENT OF NEW PRODUCTION}\\ \text{RATIO OF DECREASE OF MAN•HOUR IN SCHEDULING OPERATION}\end{Bmatrix} \tag{18}$$

Then, it is assumed that elements of the matrix Mm' are selected from the problem-index-plan-of-measures matrix Mm previously given on the basis of the above-mentioned problem-index vector f' as follows:

m11: coefficient of decrease in the number of goods in process by cell production (80%)

m12: coefficient of decrease in the number of goods in process by a production management system (5%)

m21: coefficient of decrease in lead time for commencement of new production by cell production (80%)

m22: coefficient of decrease in lead time for commencement of new production by a production management system (5%)

m31: coefficient of decrease in man-hour in the scheduling operation by cell production (−5%)

m32: coefficient of decrease in man-hour in the scheduling operation by a production management system (50%)

Further, as the plan-of-measures vector x' corresponding to the problem-index vector f', x1 and x2 are determined by the matrix Mm'. Here, it is assumed that the following plans of measures are determined.

x1: adoption of cell production system (when adopted, x1=1; when not adopted, x1=0)

x2: introduction of a production management system (when introduced, x2=1; when not introduced, x2=0)

By the use of these, $$f'=Mm'x'$$

is given as follows:

$$\begin{Bmatrix}\text{RATIO OF DECREASE OF NUMBER OF GOODS IN PROCESS}\\ \text{RATIO OF DECREASE OF LEAD TIME FOR COMMENCEMENT OF NEW PRODUCTION}\\ \text{RATIO OF DECREASE OF MAN •HOUR IN SCHEDULING OPERATION}\end{Bmatrix} = \begin{pmatrix}0.8 & 0.05\\ 0.8 & 0.05\\ -0.05 & 0.5\end{pmatrix}\begin{pmatrix}x1\\ \\ x2\end{pmatrix} \tag{19}$$

Next, among the above-mentioned plans of measures, x1 and x2, the optimum plan of measures is selected. For this selection, the limiting conditions are set. First, input of the gross investment I is required. Subsequently, the limiting conditions (1) and (2) are set as follows:

$$I>Mi\cdot x'(1)$$

Where it is assumed that:

gross investment in the case where the cell production system is adopted: 5,000,000 yen gross investment in the case where the production management system is introduced: 7,000,000 yen.

Accordingly, the limiting condition (1) is expressed as follows:

$$I>\{5\text{ M¥}7\text{ M¥}\}\cdot x'.$$

(2) The respective plans of measures, x1 and x2, are set to be "1" when adopted, or "0" when not adopted.

Next, an objective function is set. The objective function is represented with the above-mentioned equations (18) and (19) as follows:

$$\Delta P' = (a1\text{-}b1\text{-}c1\quad a2\text{-}b2\text{-}c2\quad a3\text{-}b3\text{-}c3)\begin{pmatrix}0.8 & 0.05\\ 0.8 & 0.05\\ -0.05 & 0.5\end{pmatrix}\begin{pmatrix}x1\\ \\ x2\end{pmatrix} \tag{20}$$

Solutions to the equation (19), which □P becomes maximum are found with respect to the case where any one of x1 and x2 is adopted, and the case where both of x1 and x2 are adopted. Subsequently, the profit is calculated with respect to the each resultant solutions, the gross investment is calculated therefor and it is examined whether the calculated gross investment is equal or lower than the gross investment previously input.

In the exemplified case, □P can be found with respect to all of the combinations to obtain the optimum solution because of the small scale and simplicity. However, the larger the number of possible combinations becomes, the longer the time for finding solutions thereto becomes. Therefore, it is necessary to find solutions through an appropriate algorithm. For example, the above-mentioned linear programming algorithm can be used.

Thus, since the plan of measures, which can be adopted in management reforms, is not always single, it is hard to determine the optimum solution with consideration given to all of the possible combinations. While the above-mentioned example is very simple, it is considered that a plurality of the potential plans of measures is generated because, in fact, a lot of matters are involved in determination of the optimum solutions. In such cases, it is hard to select the plans of measures to be executed, from a plurality of plans of measures, at the discretion of a human. Hence, as mentioned above, the present embodiment assists a human to determine the plan of measures through, for example, the linear programming process engine.

In the present embodiment, the gross investment can be changed. Therefore, it is possible to know how the plans of measures to be executed vary depending upon the difference in the gross investment, by setting the gross investment to various amounts of money. Namely, it is possible to simulate what degree of management reforms can be executed with how much money is invested.

Further, the risk level can be changed in the present embodiment (Step 3210 in FIG. 23). Thus, it is possible to change the potential plans of measures X' to be adopted by changing the risk level to change the relational expression between the problem indexes and the plans of measures. Namely, a range of acceptable risk is broadened by raising the risk level so that the number of the potential plans of measures increases. It is useful to find a more effective plan of measures in the case where the gross investment is limited.

When the risk levels are the same in all of the plans of measures, no judgement thereof is required. Also, it is possible to employ a constitution that the plans of measures are determined with disregard to the risk level.

In the above-mentioned embodiment, the plans of measures are determined by means of the problem-index-profit matrix Mp' and the problem-index-plan-of-measures matrix Mm'. Thereby, it is possible to reduce load of the combination operation in determination of the plans of measures. Therefore, even a computer generally distributed can perform the processing and it is expected to speed up the processing.

Further, the matrix Mp includes elements that vary depending upon the conditions of market. The matrix Mm includes elements that vary depending upon the evolution of plans of measures. In the above-mentioned embodiment, data are independent to each other so that content of the respective data can be given a necessary maintenance. Thus, it becomes possible to cope with more recent market environment, plans of measures and the like by giving maintenance.

As mentioned above, according to the present invention, it is possible to assist in forming plans of measures for management reforms in an enterprise. Namely, by only input of necessary data and instructions, even an inexpert manager can obtain plans of measures for management reforms with indexes indicating the condition of business operation of his/her enterprise.

Further, according to the present invention, plans of measures can be obtained with input of only the status data of the subject enterprise since the data previously provided can be used as data other than the status data of the subject enterprise. Therefore, the system of assisting in forming plans of measures for management reforms is suitably used by a service provider such as a consultant, who render a service to propose plans of measures for management reforms to an enterprise.

In the above-mentioned embodiment, the plans of measures are proposed by the system of the present invention. However, plans of measures are formed by another system, and adequacy of the formed plans of measures can also be verified by the above-mentioned system. Namely, the potential plans of measures are found by the same procedure as mentioned above. Subsequently, it is possible to verify the adequacy of the plans of measures formed by another system through examining whether it is included in the potential plans of measures found.

The present invention makes it possible to form specific plans of measures for management reforms of an individual enterprise regardless of the experience of a person who forms the plans. Further, it makes possible to verify the adequacy of formed plans of measures.

What is claimed is:

1. A method of assisting in forming plans of measures for management reforms, which is executed by an information processor, comprising steps of:

storing in a data storage device a general business-operation-index group including a plurality of indexes indicating the condition of business operation of an enterprise, a general plan-of-measures group including a plurality of plans of measures, each of which is information showing how to deal with the condition indicated by the respective indexes included in said general business-operation-index group, a first correlation-information group including a plurality of correlation information, each of which defines the correlation between the respective indexes included in the general business-operation-index group and the respective plans of measures included in the general plan-of-measures group, risk level information indicating levels of risk caused when each plan of measures is executed, and investment information indicating investment amount necessary to execute the measures included in the general plan-of-measures;

by comparing business operation index data of the enterprise to be reformed and the general business-operation index group, producing a problem-index group by extracting, as problem indexes indicating problems in the business operations to be improved, one or more business operation indexes from the general operation-index group and stored in the data storage device;

accepting input of information indicating acceptable risk level;

producing the second correlation-information group by extracting correlation information which relates to the problem indexes included in the problem-index group, and which relates to a plan of measures having a lower risk level than the inputted risk level from the first correlation-information group;

accepting input of gross investment to be invested to the management reform;

producing a potential plan-of-measures group by selecting one or more plans of measures which relates to the second correlation-information group and which has a lower gross investment than the inputted investment amount from the general plan-of-measures group; and outputting the resultant one or more potential plans of measures included in the potential plan-of-measures group.

2. The method of assisting in forming plans of measures for management reforms according to claim 1, wherein a business-operation-index-profit correlation-information group including correlation information which correlate the profit of the enterprise to be reformed with the general business operation indexes, is further stored in the data storage device;

a problem-index-profit correlation-information group is produced by extracting information which describe correlation relating to the problem indexes from the business-operation-index-profit correlation-information group;

a final plan-of-measures group including plans of measures which maximize the profit of the enterprise is found out from the potential plan of means included in the potential plan-of-measures group, under the limiting conditions that that the each plans of measures is either adopted or not adopted; and the resultant final plans of measures are output.

3. The method of assisting in forming plans of measures for management reforms according to claim 2, wherein input of target profit of the enterprise is further accepted by the information processor; and it is judged whether the profit of the enterprise obtained by the each found plans of measures is equal or larger than the input target profit, to output the plans of measures when it is equal or larger.

4. A method of assisting in forming plans of measures for management reforms, said method, being executed by an information processor, comprising the steps of:

storing a general business-operation-index group including a plurality of indexes indicating a condition of business operation of an enterprise, a general plan-of-measures group including a plurality of plans of measures, each of which is information showing how to deal with the condition indicated by respective indexes included in said general business-operation-index group, a first correlation-information group including a plurality of correlation information, each of which defines a correlation between the respective indexes included in the general business-operation-index group and respective plans of measures included in the general plan-of-measures group, risk level information indicating levels of risk caused when the each plan of measures included in the general plan-of-measures group is executed, gross investment information indicating an amount of investment necessary to execute the each plan of measures included in the general plan-of-measures, and a business-operation-index-profit correlation-information group including correlation information which correlate the profit of the enterprise with the general business operation indexes in a data storage device;

producing a problem-index group by extracting, as problem indexes indicating problems in the business operations to be improved, one or more business operation indexes from the general operation-index group and stored in the data storage device;

producing a potential plan-of-measures group by selecting one or more plans of measures relating to the second correlation-information group from the general plan-of-measures group;

outputting a resultant one or more potential plans of measures included in the potential plans-of-measures group;

accepting input of information designating an acceptable risk level by the information processor;

producing the second correlation-information group by extracting information which define correlation relating to the problem indexes included in the problem-index group from the first-correlation group, and to plans of measures having a risk level equal or lower than the input risk level, also from the first correlation-information group;

producing a problem-index-profit correlation-information group by extracting information which describe correlation relating to the problem indexes from the business-operation-index-profit correlation-information group;

accepting input of the gross investment intended to invest in management reforms by the information processor;

adopting or not adopting a final plan-of-measures group including plans of measures which maximize the profit of the enterprise is found out from the potential plan of means included in the potential plan-of-measures group, under the limiting conditions that the gross investment necessary to execute the each selected plan of measures is equal or lower than the input gross investment and that the each plans of measures;

resultant final plans of measures are output;

accepting input of target profit of the enterprise is accepted by the information processor;

judging whether the profit of the enterprise obtained by the each found plans of measures is equal or larger than the input target profit, to output the plans of measures when it is equal or larger;

accepting a change of the acceptable risk level by the information processor when the profit of the enterprise given by the found plans of measures is less than the target profit; and when the acceptable risk level is changed, selecting information which define correlation relating to the problem indexes and to the plans of measures having a risk level equal or lower than the changed risk level from the first correlation-information group, to produce the second correlation-information group.

5. A method of assisting in forming plans of measures for management reforms, said method being executed by an information processor, comprising the steps of:

storing a general business-operation-index group including a plurality of indexes indicating a condition of business operation of an enterprise, a general plan-of-measures group including a plurality of plans of measures, each of which is information showing how to deal with the condition indicated by respective indexes included in said general business-operation-index group, a first correlation-information group including a plurality of correlation information, each of which defines a correlation between the respective indexes included in the general business-operation-index group and respective plans of measures included in the general plan-of-measures group, risk level information indicating levels of risk caused when the each plan of measures included in the general plan-of-measures group, gross investment information indicating the amount of investment necessary to execute the each plan of measures included in the general plan-of-measures, and a business-operation-index-profit correlation-information group including correlation information which correlate the profit of the enterprise with the general business operation indexes in a data storage device;

producing a problem-index group by extracting, as problem indexes indicating problems in the business operations to be improved, one or more business operation indexes from the general operation-index group and stored in the data storage device;

producing a second correlation-information group by extracting correlation information relating to problem indexes included in the problem-index group from the first correlation-information group;

producing a potential plan-of-measures group by selecting one or more plans of measures relating to the second correlation-information group from the general plan-of-measures group;

outputting a resultant one or more potential plans of measures included in the potential plans-of-measures group;

accepting input of information designating an acceptable risk level by the information processor;

producing the second correlation-information group by extracting information which define correlation relating to the problem indexes and to plans of measures having a risk level equal or lower than the input risk level, from the first correlation-information group;

producing a problem-index-profit correlation-information group by extracting information which describe correlation relating to the problem indexes from the business-operation-index-profit correlation-information group;

accepting input of the gross investment intended to invest in management reforms by the information processor;

adopting or not adopting a final plan-of-measures group including plans of measures which maximize the profit of the enterprise is found out from the potential plan of means included in the potential plan-of-measures group, under the limiting conditions that the gross investment necessary to execute the each selected plan of measures is equal or lower than the input gross investment and that the each plans of measures;

resultant final plans of measures are output;

accepting input of target profit of the enterprise is accepted by the information processor;

judging whether the profit of the enterprise obtained by the each found plans of measures is equal or larger than the input target profit, to output the plans of measures when it is equal or larger;

accepting a change of the gross investment intended to be invested in management reforms by the information processor when the profit of the enterprise given by the found plan of measures is lower than the target profit;

adopting or not adopting a final plan of measures which maximizes the profit of the enterprise are found from the selected potential plans of measures under the limiting conditions that the gross investment intended to be invested in management reforms necessary to execute the selected plan of measures is equal or lower than the changed gross investment and that the each plan of measures; and outputting resultant final plans of measures.

6. A system of assisting in forming plans of measures for management reforms executed by an information processor, wherein said information processor includes an input device, a data storage device, a central processor, and an output device;

said data storage device stores a general business-operation-index group including a plurality of indexes indicating the condition of business operation of an enterprise, a general plan-of-measures group including a plurality of plans of measures, each of which is information showing how to deal with the condition indicated by the respective indexes included in said general business-operation-index group, a first correlation-information group including a plurality of correlation information, each of which defines the correlation between the respective indexes included in the general business-operation-index group and the respective plans of measures included in the general plan-of-measures group, risk level information indicating levels of risk caused when each plan of measures is executed, gross investment information indicating investment amount necessary to carry out the measures, and a problem-index group produced by extracting, as problem indexes indicating problems in the business operations to be improved, one or more business operation indexes from the general operation-index group, and by comparing the business operation index data of the enterprise to be reformed and the general business-operation index group; and said central processor executes the following steps of:

accepting input of information indicating acceptable risk level;

producing a second correlation-information group by extracting correlation information which relates to the problem indexes included in the problem-index group and which relates to a plan of measures having a lower risk level than the inputted risk level from the first correlation-information group;

accepting input of gross investment to be invested to the management reform through the input device, producing a potential plan-of-measures group by selecting one or more plans of measures which relates to the second correlation-information group and which has a lower investment amount than the inputted gross investment amount from the general plan-of-measures group; and outputting the resultant one or more potential plans of measures included in the potential plan-of-measures group through the input and output devices.

7. The system of assisting in forming plans of measures for management reforms executed by an information processor according to claim 6, wherein:

the data storage device further stores a business-operation-index-profit correlation-information group including correlation information which correlate the profit of the enterprise with the general business operation indexes; and the central processor further executes the following steps of:

producing a problem-index-profit correlation-information group by extracting information which describe correlation relating to the problem indexes from the business-operation-index-profit correlation-information group;

finding a final plan-of-measures group including plans of measures which maximize the profit of the enterprise from the potential plan of means included in the potential plan-of-measures group, under the limiting conditions that the each plans of measures is either adopted or not adopted; and outputting the resultant final plans of measures through the output device.

8. The system of assisting in forming plans of measures for management reforms executed by an information processor according to claim 7, wherein the central processor further executes the following steps of:

further accepting input of target profit of the enterprise through the input device; and judging whether the profit of the enterprise obtained by the each found plans of measures is equal or larger than the input target profit, to output the plans of measures through the output device when it is equal or larger.

9. A system of assisting in forming plans of measures for management reforms comprising:

an information processor which executes the plans of measures for management reforms, wherein said information processor comprises:

an input device, a data storage device, a central processor, and an output device, wherein said data storage device stores a general business-operation-index group including a plurality of indexes indicating the condition of business operation of an enterprise, a general plan-of-measures group including a plurality of plans of measures, each of which is information showing how to deal with the condition indicated by the respective indexes included in said general business-operation-index group, a first correlation-information group including a plurality of correlation information, each of which defines the correlation between the respective indexes included in the general business-operation-index group and the respective plans of measures included in the general plan-of-measures group, a problem-index group produced by extracting, as problem indexes indicating problems in the business operations to be improved, one or more business operation indexes from the general operation-index group, risk level information indicating levels of risk caused when the each plan of measures included in the general plan-of-measures group is executed, gross investment information indicating the amount of investment necessary to execute the each plan of measures included in the general plan-of-measures, and a business-operation-index-profit correlation-information group including correlation information which correlate the profit of the enterprise with the general business operation indexes, and wherein said central processor executes the following steps of:

producing a second correlation-information group by extracting correlation information relating to the problem indexes included in the problem-index group from the first correlation-information group, producing a potential plan-of-measures group by selecting one or more plans of measures relating to the second correlation-information group from the general plan-of-measures group, and outputting the resultant one or more potential plans of measures included in the potential plan-of-measures group through the input/output device;

accepting input of information designating the acceptable risk level, and producing the second correlation-information group by extracting information which define correlation relating to the problem indexes and to plans of measures having a risk level equal or lower than the input risk level, from the first correlation-information group;

producing a problem-index-profit correlation-information group by extracting information which describe correlation relating to the problem indexes from the business-operation-index-profit correlation-information group, accepting input of the gross investment intended to invest in management reforms, finding a final plan-of-measures group including plans of measures which maximize the profit of the enterprise from the potential plan of means included in the potential plan-of-measures group, under the limiting conditions that the gross investment necessary to execute the each selected plan of measures is equal or lower than the input gross investment and that the each plans of measures is either adopted or not adopted, outputting the resultant final plans of measures through the output device;

accepting input of target profit of the enterprise through the input device;

judging whether the profit of the enterprise obtained by the each found plans of measures is equal or larger than the input target profit, to output the plans of measures through the output device when it is equal or larger;

accepting change of the risk level when the profit of the enterprise given by the found plans of measures is less than the target profit through the input device, and when the risk level is changed, selecting information which define correlation relating to the problem indexes and to the plans of measures having a risk level equal or lower than the changed risk level from the first correlation-information group, to produce the second correlation-information group.

10. A system of assisting in forming plans of measures for management reforms comprising:

an information processor which executes the plan of measures for management reforms, wherein said information processor comprises:

an input device, a data storage device, a central processor, and an output device, wherein said data storage device stores a general business-operation-index group including a plurality of indexes indicating the condition of business operation of an enterprise, a general plan-of-measures group including a plurality of plans of measures, each of which is information showing how to deal with the condition indicated by the respective indexes included in said general business-operation-index group, a first correlation-information group including a plurality of correlation information, each of which defines the correlation between the respective indexes included in the general business-operation-index group and the respective plans of measures included in the general plan-of-measures group, a problem-index group produced by extracting, as problem indexes indicating problems in the business operations to be improved, one or more business operation indexes from the general operation-index group, risk level information indicating levels of risk caused when the each plan of measures included in the general plan-of-measures group is executed, gross investment information indicating the amount of investment necessary to execute the each plan of measures included in the general plan-of-measures, and a business-operation-index-profit correlation-information group including correlation information which correlate the profit of the enterprise with the general business operation indexes;

wherein said central processor executes the following steps of:

producing a potential plan-of-measures group by selecting one or more plans of measures relating to the second correlation-information group from the general plan-of-measures group, and outputting the resultant one or more potential plans of measures included in the potential plan-of-measures group through the input/output device;

accepting input of information designating the acceptable risk level;

producing the second correlation-information group by extracting information which define correlation relating to the problem indexes included in the problem-index group from the first correlation-information group, and to plans of measures having a risk level equal or lower than the input risk level, also from the first correlation-information group;

producing a problem-index-profit correlation-information group by extracting information which describe correlation relating to the problem indexes from the business-operation-index-profit correlation-information group, accepting input of the gross investment intended to invest in management reforms, finding a final plan-of-measures group including plans of measures which maximize the profit of the enterprise from the potential plan of means included in the potential plan-of-measures group, under the limiting conditions that the gross investment necessary to execute the each selected plan of measures is equal or lower than the input gross investment and that the each plans of measures is either adopted or not adopted;

outputting the resultant final plans of measures through the output device;

accepting input of target profit of the enterprise through the input device;

judging whether the profit of the enterprise obtained by the each found plans of measures is equal or larger than the input target profit, to output the plans of measures through the output device when it is equal or larger;

accepting change of the gross investment when the profit of the enterprise given by the found plan of measures is lower than the target profit through the input device, finding a final plan of measures which maximizes the profit of the enterprise from the selected potential plans of measures under the limiting conditions that the gross investment necessary to execute the selected plan of measures is lower than the changed gross investment and that the each plan of measures is either adopted or not adopted, and outputting the resultant final plans of measures through the output device.

11. A program product read in and executed by a computer having a storage device to cause said computer to perform processing of assisting in forming plans of measures for management reforms, wherein the program causes the computer to perform the following processing of:

storing a general business-operation-index group including a plurality of indexes indicating the condition of business operation of an enterprise, a general plan-of-measures group including a plurality of plans of measures, each of which is information showing how to deal with the condition indicated by the respective indexes included in said general business-operation-index group, a first correlation-information group including a plurality of correlation information, each of which defines the correlation between the respective indexes included in the general business-operation-index group and the respective plans of measures included in the general plan-of-measures group, risk level information indicating levels of risk caused when each plan of measures is executed, and investment information indicating gross investment amount necessary for executing the measure, in a data storage device;

by comparing business operation index data of the enterprise to be reformed and the general business-operation index group, producing a problem-index group by extracting, as problem indexes indicating problems in the business operations to be improved, one or more business operation indexes from the general operation-index group and stored in the data storage device;

accepting input of information specifying acceptable risk level;

producing the second correlation-information group by extracting correlation information which relates to the problem indexes included in the problem-index group and which relates to a plan-of-measures having a lower risk level than the inputted risk level from the first correlation-information group;

accepting input of gross investment amount to be invested to the management reform;

producing a potential plan-of-measures group by selecting one or more plans of measures which relates to the second correlation-information group and which has a lower gross investment amount than the inputted investment amount from the general plan-of-measures group; and outputting the resultant one or more potential plans of measures included in the potential plan-of-measures group.

12. The program product for performing processing of assisting in forming plans of measures for management reforms according claim 11, wherein the program causes the computer to further perform the following processing of:

further storing a business-operation-index-profit correlation-information group including correlation information which correlate the profit of the enterprise with the general business operation indexes in the data storage device;

producing a problem-index-profit correlation-information group by extracting information which describe correlation relating to the problem indexes from the business-operation-index-profit correlation-information group;

finding a final plan-of-measures group including plans of measures which maximize the profit of the enterprise from the potential plan of means included in the potential plan-of-measures group, under the limiting conditions that the each plans of measures is either adopted or not adopted; and outputting the resultant final plans of measures.

13. The program product for performing processing of assisting in forming plans of measures for management reforms according claim 12, wherein the program causes the computer to further perform the following processing of:

further accepting input of target profit of the enterprise; and judging whether the profit of the enterprise obtained by the each found plans of measures is equal or larger than the input target profit, to output the plans of measures when it is equal or larger.

14. A program of a program product read in and executed by a computer having a storage device to cause said computer to perform processing of assisting in forming plans of measures for management reforms, the program causes the computer to perform the following processing of:

storing a general business-operation-index group including a plurality of indexes indicating the condition of business operation of an enterprise, a general plan-of-measures group including a plurality of plans of measures, each of which is information showing how to deal with the condition indicated by the respective indexes included in said general business-operation-index group, and the first correlation-information group including a plurality of correlation information, each of which defines the correlation between the respective indexes included in the general business-operation-index group and the respective plans of measures included in the general plan-of-measures group, storing risk level information indicating levels of risk caused when the each plan of measures included in the general plan-of-measures group is executed, gross investment information indicating the amount of investment necessary to execute the each plan of measures included in the general plan-of-measures, and a business-operation-index-profit correlation-information group including correlation information which correlate the profit of the enterprise with the general business operation indexes in a data storage device;

producing a problem-index group by extracting, as problem indexes indicating problems in the business operations to be improved, one or more business operation indexes from the general operation-index group and stored in the data storage device;

producing a potential plan-of-measures group by selecting one or more plans of measures relating to the second correlation-information group from the general plan-of-measures group;

outputting the resultant one or more potential plans of measures included in the potential plans-of-measures group;

accepting input of information designating the acceptable risk level;

producing the second correlation-information group by extracting information which define correlation relating to the problem indexes included in the problem-index group from the first correlation-information group, and to plans of measures having a risk level equal or lower than the input risk level, also from the first correlation-information group;

producing a problem-index-profit correlation-information group by extracting information which describe correlation relating to the problem indexes from the business-operation-index-profit correlation-information group;

accepting input of the gross investment intended to invest in management reforms;

finding a final plan-of-measures group including plans of measures which maximize the profit of the enterprise from the potential plan of means included in the potential plan-of-measures group, under the limiting conditions that the gross investment necessary to execute the each selected plan of measures is equal or lower than the input gross investment and that the each plans of measures is either adopted or not adopted;

outputting the resultant final plans of measures;

accepting input of target profit of the enterprise;

judging whether the profit of the enterprise obtained by the each found plans of measures is equal or larger than the input target profit, to output the plans of measures when it is equal or larger;

accepting change of the risk level when the profit of the enterprise given by the found plans of measures is less than the target profit; and when the risk level is changed, selecting information which define correlation relating to the problem indexes and to the plans of measures having a risk level equal or lower than the changed risk level from the first correlation-information group, to produce the second correlation-information group.

15. A program of a program product read in and executed by a computer having a storage device to cause said computer to perform processing of assisting in forming plans of measures for management reforms, the program causes the computer to perform the following processing of:

storing a general business-operation-index group including a plurality of indexes indicating the condition of business operation of an enterprise, a general plan-of-measures group including a plurality of plans of measures, each of which is information showing how to deal with the condition indicated by the respective indexes included in said general business-operation-index group, and the first correlation-information group including a plurality of correlation information, each of which defines the correlation between the respective indexes included in the general business-operation-index group and the respective plans of measures included in the general plan-of-measures group, risk level information indicating levels of risk caused when the each plan of measures included in the general plan-of-measures group is executed, gross investment information indicating the amount of investment necessary to execute the each plan of measures included in the general plan-of-measures, and a business-operation-index-profit correlation-information group including correlation information which correlate the profit of the enterprise with the general business operation indexes in a data storage device;

producing a problem-index group by extracting, as problem indexes indicating problems in the business operations to be improved, one or more business operation indexes from the general operation-index group and stored in the data storage device;

producing a potential plan-of-measures group by selecting one or more plans of measures relating to the second correlation-information group from the general plan-of-measures group;

outputting the resultant one or more potential plans of measures included in the potential plans-of-measures group;

accepting input of information designating the acceptable risk level;

producing the second correlation-information group by extracting information which define correlation relating to the problem indexes included in the problem-index group from the first correlation-information group, and to plans of measures having a risk level equal or lower than the input risk level, also from the first correlation-information group;

producing a problem-index-profit correlation-information group by extracting information which describe correlation relating to the problem indexes from the business-operation-index-profit correlation-information group;

accepting input of the gross investment intended to invest in management reforms;

finding a final plan-of-measures group including plans of measures which maximize the profit of the enterprise from the potential plan of means included in the potential plan-of-measures group, under the limiting conditions that the gross investment necessary to execute the each selected plan of measures is equal or lower than the input gross investment and that the each plans of measures is either adopted or not adopted;

outputting the resultant final plans of measures;

accepting input of target profit of the enterprise;

judging whether the profit of the enterprise obtained by the each found plans of measures is equal or larger than the input target profit, to output the plans of measures when it is equal or larger;

accepting change of the gross investment when the profit of the enterprise given by the found plan of measures is equal or lower than the target profit;

finding a final plan of measures which maximizes the profit of the enterprise from the selected potential plans of measures under the limiting conditions that the gross investment necessary to execute the selected plan of measures is lower than the changed gross investment and that the each plan of measures is either adopted or not adopted; and outputting the resultant final plans of measures.

16. A method of assisting in forming plans of measures for management reforms, said method, being executed by an information processor, comprising the steps of:

storing a general business-operation-index group including a plurality of indexes indicating the condition of business operation of an enterprise, a general plan-of-measures group including a plurality of plans of measures, each of which is information showing how to deal with the condition indicated by the respective indexes included in said general business-operation-index group, a first correlation-information group including a plurality of correlation information, each of which defines the correlation between the respective indexes included in the general business-operation-index group and the respective plans of measures included in the general plan-of-measures group and reference data, to which the condition of business operation of said enterprise is compared, in a data storage device;

accepting input of information indicating the current condition of business operation of the enterprise by the information processor;

producing a problem-index group by extracting, as problem indexes indicating problems in the business operations to be improved, one or more business operation indexes from the general operation-index group, on the basis of the result obtained by comparing the information indicating the current condition of business operation of the enterprise with the reference data for comparison and stored in the data storage device;

producing a second correlation-information group by extracting correlation information relating to the problem indexes included in the problem-index group from the first correlation-information group;

producing a potential plan-of-measures group by selecting one or more plans of measures relating to the second correlation-information group from the general plan-of-measures group;

outputting the resultant one or more potential plans of measures included in the potential plans-of-measures group; and downloading, for comparison, said reference data that corresponds to the category of business to which the enterprise belongs, and the problem-index group from a server accumulating said reference data via a network.

17. A computer-implemented method of assisting in forming plans of measures for management reforms executed by an information processor, comprising the steps of:

storing a general business-operation-index group including a plurality of indexes indicating the condition of business operation of an enterprise, a general plan-of-measures group including a plurality of plans of measures, each of which is information showing how to deal with the condition indicated by the respective indexes included in said general business-operation-index group, a first correlation-information group including a plurality of correlation information, each of which defines the correlation between the respective indexes included in the general business-operation-index group and the respective plans of measures included in the general plan-of-measures group and reference data, to which the condition of business operation of said enterprise is compared, in a data storage device;

accepting input of information indicating the current condition of business operation of the enterprise by the information processor;

producing a problem-index group by extracting, as problem indexes indicating problems in the business operations to be improved, one or more business operation indexes from the general operation-index group, on the basis of the result obtained by comparing the information indicating the current condition of business operation of the enterprise with the reference data for comparison and stored in the data storage device;

producing a second correlation-information group by extracting correlation information relating to the problem indexes included in the problem-index group from the first correlation-information group;

producing a potential plan-of-measures group by selecting one or more plans of measures relating to the second correlation-information group from the general plan-of-measures group;

outputting the resultant one or more potential plans of measures included in the potential plans-of-measures group;

downloading, for comparison, from a server network, said reference data that corresponds to the category of business to which the enterprise belongs and a program of assisting informing plans of measures, executing said downloaded program, using said reference data to perform the following processing of:

accepting input of information indicating the current condition of business operation of the enterprise;

producing the problem-index group;

producing the second correlation-information group;

selecting the potential plan-of-measures; and outputting the potential plans of measures.

* * * * *